(12) United States Patent
Tuchrelo et al.

(10) Patent No.: US 12,161,135 B2
(45) Date of Patent: *Dec. 10, 2024

(54) METHOD AND APPARATUS FOR REDUCING REQUIRED FREQUENCY FOR MANUAL CLEANING OF AT LEAST PORTIONS OF A FOOD FLOW PATH IN A FOOD PROCESSOR

(71) Applicant: TAYLOR COMMERCIAL FOODSERVICE, LLC, Rockton, IL (US)

(72) Inventors: Robert Tuchrelo, Williamson, NY (US); Nathan E. Smith, Hamlin, NY (US)

(73) Assignee: TAYLOR COMMERCIAL FOODSERVICE, LLC, Rockton, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/203,756

(22) Filed: May 31, 2023

(65) Prior Publication Data

US 2023/0301323 A1 Sep. 28, 2023

Related U.S. Application Data

(63) Continuation of application No. 16/018,894, filed on Jun. 26, 2018, now Pat. No. 11,717,005.

(60) Provisional application No. 62/524,984, filed on Jun. 26, 2017.

(51) Int. Cl.
*A23G 9/30* (2006.01)
*B08B 3/08* (2006.01)

(52) U.S. Cl.
CPC .................. *A23G 9/30* (2013.01); *B08B 3/08* (2013.01); *B08B 2209/027* (2013.01)

(58) Field of Classification Search
CPC ........ A23G 9/30; B08B 2209/027; B08B 3/08
See application file for complete search history.

(56) References Cited

U.S. PATENT DOCUMENTS

| | | | | |
|---|---|---|---|---|
| 4,848,381 A | * | 7/1989 | Livingston | B67D 1/07 141/90 |
| 11,717,005 B2 | * | 8/2023 | Tuchrelo | A23G 9/30 134/18 |
| 2007/0102448 A1 | * | 5/2007 | Harra | A23G 9/20 62/340 |

FOREIGN PATENT DOCUMENTS

| WO | 2015/038360 | | 3/2015 | |
|---|---|---|---|---|
| WO | WO-2015038360 A1 | * | 3/2015 | ............... A23G 9/30 |

OTHER PUBLICATIONS

Hydra Rinse Operator Manual (Year: 2013).*
Hydra Rinse Wash Solution Material Safety Data Sheet (Year: 2006).*
EPA Notice of Pesticide (Year: 2015).*

(Continued)

*Primary Examiner* — Douglas Lee
(74) *Attorney, Agent, or Firm* — Barnes & Thornburg LLP

(57) ABSTRACT

A system and method for treating a portion of a food flow path in a food processor having a freezer chamber includes imparting a continuous flow of solution through a portion of the food flow path with sufficient flow rate, temperature and flow duration to impart at least one of (i) impart at least a 6 log reduction in inoculum count and (ii) extend the necessary time for manual cleaning of the portion of a food flow path exposed to the continuous flow of solution to at least 7 days.

28 Claims, 16 Drawing Sheets

(56) References Cited

OTHER PUBLICATIONS

Hydra Rinse Wash Soultion Material Safety Data Sheet (Year: 2006).
Hydra Rinse, LLC, Hydra Rinse Model No. HRF1-0 Operating Manual and Installation Guidelines, ii 101-0881 C, Copyright 2020.
Idea Boxx, LLC, MSDS on Hydra Rinse Wash Solution, Oct. 3, 2006.
Idea Boxx, LLC, Operating Instructions for Models TAYOM794-M and TAYHRC713 published Oct. 29, 2013.
NS/ANSI, Standards for Dispensing Freezers, published by NSF International 2012, Rev. Jan. 4, 2013.
Taylor Company, Original Operating Instructions, Model C723, #069127-M, Original Publication, Mar. 2011, Updated Aug. 2012.
U.S. Environmental Protection Agency, Office of Pesticide Programs, Notice of Pesticide Registration for Lexx Liquid Sanitizer & Cleaner Concentrate, EPA Reg. No. 91452-1, Issued Sep. 18, 2015.

\* cited by examiner

METHOD AND APPARATUS FOR REDUCING REQUIRED FREQUENCY FOR MANUAL CLEANING OF AT LEAST PORTIONS OF A FOOD FLOW PATH IN A FOOD PROCESSOR

CROSS-REFERENCE TO RELATED APPLICATIONS

This application is a continuation of U.S. Nonprovisional application Ser. No. 16/018,894, filed on Jun. 26, 2018, which claims the benefit of U.S. Provisional application No. 62/524,984, filed Jun. 26, 2017, the entirety of which are each fully incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The present application relates to food preparation and particularly to a method and apparatus for treating a food flow path in a food processor such as a food processor having a freezer chamber in the food flow path, without requiring disassembly, or with reduced disassembly while meeting applicable food safety regulations or standards.

BRIEF SUMMARY

In one configuration, the present disclosure provides a method including simultaneously (i) optionally removing a portion of food product from a freezer chamber of a food processor, the freezer chamber including an inlet for receiving a food product into the freezer chamber and an outlet for passing the food product from the freezer chamber and (ii) introducing a fluid into the freezer chamber to provide at least one of (x) impart an at least 6 log reduction in inoculum count; (y) extend the time for necessary removal of a freezer door defining a portion of a food flow path in the food processor to impart manual cleaning to at least 7 days and (z) extend the time for required manual cleaning of the portion of the food flow path to at least 7 days.

It is contemplated extending the time for manual cleaning of the portion of the food flow path to at least 14 days and in further configurations extending the time for required manual cleaning of the portion of the food flow path to at least 28 days. Thus, the method can include extending the time for necessary removal of the freezer door to at least 14 days and in further configurations to 28 days.

The present disclosure also provides a method including simultaneously (i) removing at least a portion of food product from a freezer chamber of a food processor, the freezer chamber including an inlet for receiving a food product into the freezer chamber and an outlet for passing the food product from the freezer chamber and (ii) introducing a fluid into the freezer chamber to provide at least one of (x) impart an at least 6 log reduction in inoculum count; (y) extend the time for necessary removal of a freezer door defining a portion of a food flow path in the food processor to impart manual cleaning to at least 7 days and (z) extend the time for required manual cleaning of the portion of the food flow path to at least 7 days.

A further method includes draining a freezer chamber of a food processor to remove at least a portion of food product from the freezer chamber, the freezer chamber including an inlet for receiving a food product into the freezer chamber and an outlet for passing the food product from the freezer chamber; and at least one of introducing a fluid into the freezer chamber and at least one of agitating, flowing and agitating and flowing the fluid in the freezer chamber to provide at least one of (1) a 6 log reduction in inoculum count; (y) provide a necessary frequency for removal of a door defining a portion of a food flow path in the food processor to impart manual cleaning to at least 7 days and (z) provide a necessary frequency for required manual cleaning of the freezer chamber to at least 7 days.

The present disclosure provides a further method including optionally draining a freezer chamber of a food processor to remove at least a portion of food product from the freezer chamber, the freezer chamber including an inlet for receiving a food product into the freezer chamber and an outlet for passing the food product from the freezer chamber; and at least one of introducing a fluid into the freezer chamber and at least one of agitating, flowing and agitating and flowing the fluid in the freezer chamber to provide at least one of (1) a 6 log reduction in inoculum count; (y) provide a necessary frequency for removal of a door defining a portion of a food flow path in the food processor to impart manual cleaning to at least 7 days and (z) provide a necessary frequency for required manual cleaning of the freezer chamber to at least 7 days.

Another method is providing having the steps of removing at least a portion of a food product from a freezer chamber, the freezer chamber having an inlet port for receiving the food product from an upstream supply into the freezer chamber and an outlet port for passing the food product from the freezer chamber; and introducing a sufficient volume of fluid into the freezer chamber with sufficient energy to at least one of (i) impart at least a 6 log reduction in inoculum count and (ii) extend the necessary time for manual cleaning of the portion of a food flow path exposed to the introduced fluid to at least 7 days.

A further method includes optionally removing at least a portion of a food product from a freezer chamber, the freezer chamber having an inlet port for receiving the food product from an upstream supply into the freezer chamber and an outlet port for passing the food product from the freezer chamber, and a freezer door closing an access to the freezer chamber; retaining the freezer door in a closed position; and passing a continuous flow of a solution through the freezer chamber at minimum predetermined flow rate and temperature for a predetermined flow duration to at least one of (i)

impart at least a 6 log reduction in inoculum count and (ii) extend the necessary time for manual cleaning of the portion of a food flow path exposed to the introduced fluid to at least 7 days.

Also provided is a method of treating at least a portion of a food flow path in a food processor, including retaining a freezer door in a closed position relative to a freezer chamber in the food flow path, the freezer door moveable between an open position and the closed position; and continuously flowing a solution at a sufficient flow rate and sufficient temperature for a sufficient duration through the freezer chamber to at least one of (i) impart at least a 6 log reduction in inoculum count and (ii) extend the necessary time for manual cleaning of the portion of a food flow path exposed to the introduced fluid to at least 7 days.

The method is set forth of providing a food processor with (i) a food flow path having a freezer chamber with an inlet and an outlet; and door removably connected to the freezer chamber; operably connecting a controller to at least one of a temperature sensor and the flow meter; wherein the controller is configured to provide a continuous flow of solution through at least a portion of the freezer chamber, the continuous flow having a flow rate of a solution through at least a portion of the food processor including the freezer chamber with the door in the closed position sufficient to at least one of (i) impart at least a 6 log reduction in inoculum count and (ii) extend the necessary time for manual cleaning of the portion of a food flow path exposed to the introduced fluid to at least 7 days.

A food processor is disclosed having a food flow path; a freezer chamber in the food flow path, the freezer chamber having a door moveable between and open position and a closed position; at least one of a temperature sensor and a flow meter operably connected to the flood flow path; and a controller operably connected to the at least one of the temperature sensor and the flow meter, wherein the controller is configured to impart a continuous solution flow through the freezer chamber having the door in the closed position and the solution flow sufficient to at least one of (i) impart at least a 6 log reduction in inoculum count and (ii) extend the necessary time for manual cleaning of the portion of a food flow path exposed to the introduced fluid to at least 7 days.

BRIEF DESCRIPTION OF THE SEVERAL VIEWS OF THE DRAWING(S)

DETAILED DESCRIPTION

Figure 1:
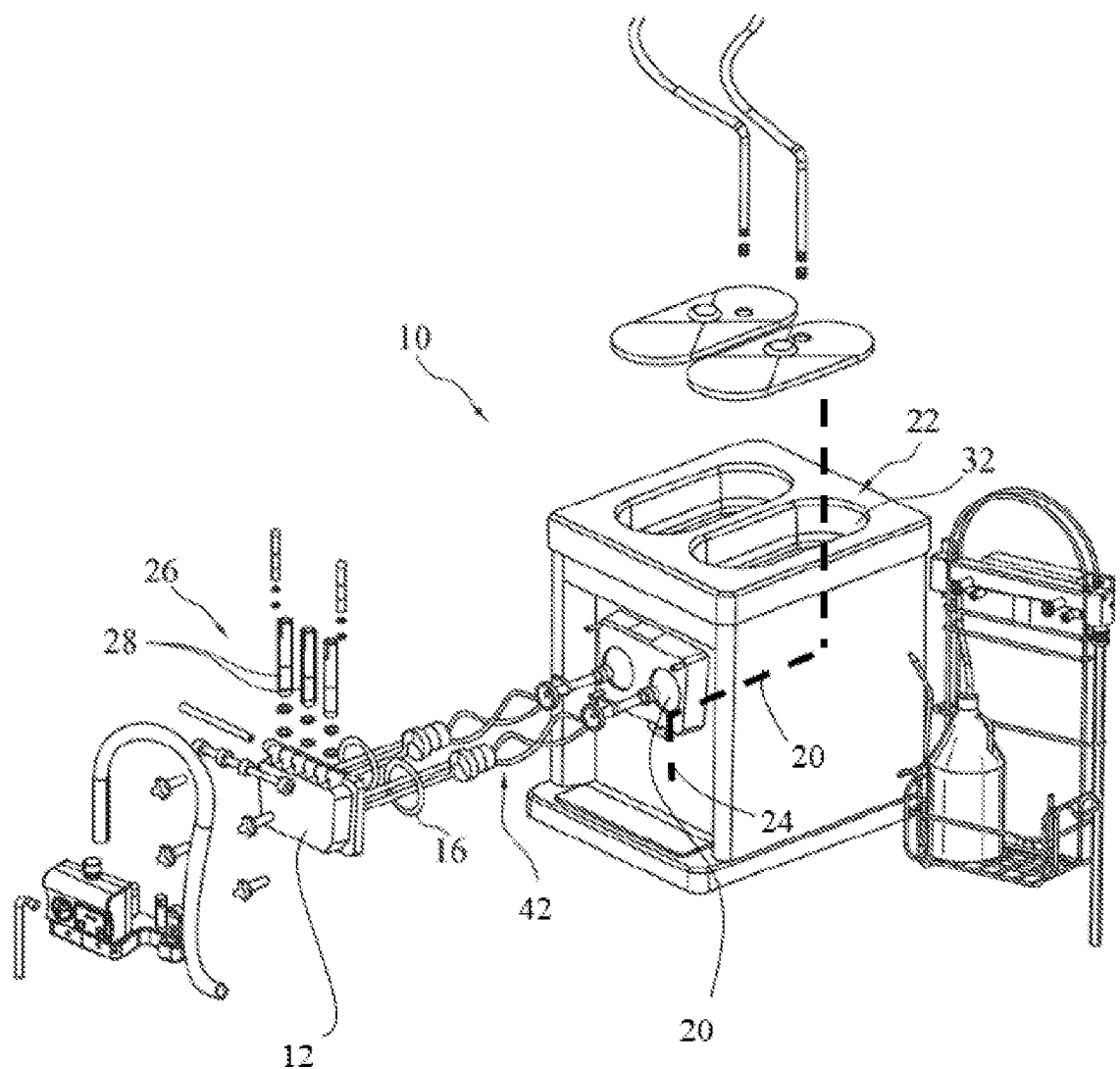
FIG. 1 is an exploded perspective view of a representative food processor.

FIG. 1 illustrates a representative food processor 10. The food processor 10 can be any of a variety of configurations for processing any of a variety of food products including, but not limited to, frozen or chilled food product including but not limited to, beverages such as sodas, beer or wine, ice or iced food products, desserts, diary based products as well as cooked and/or extruded food product.

Figure 2:
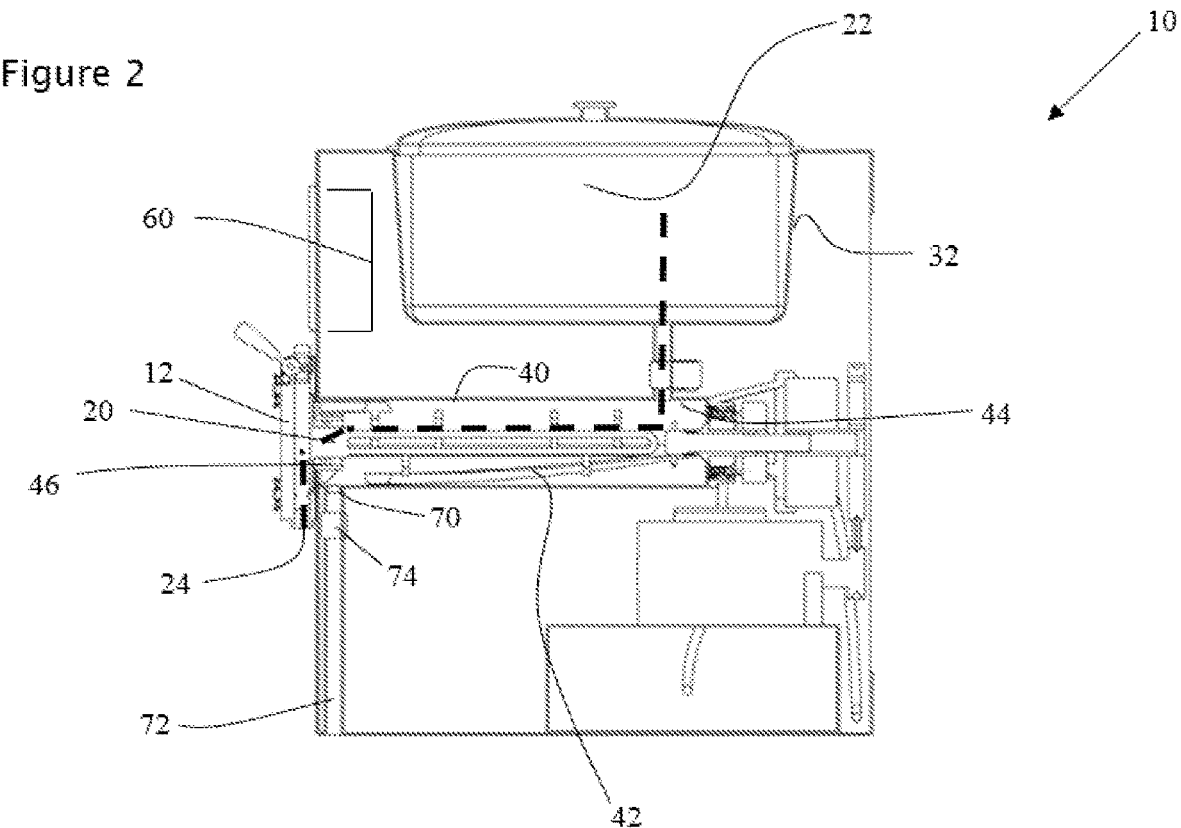
FIG. 2 is side elevational cross sectional view of the food processor.

Referring to FIGS. 1 and 2, in one configuration, the food processor 10 includes a first food flow path 20 and a second food flow path 20' extending from an input or upstream portion or end 22, such as a reservoir, feed tube, bag, box, line inlet or a hopper 32 to an output or downstream portion or end 24, such as a dispensing interface 26 from which the food product exits the food processor. While the hopper 32 is shown as a reservoir of the food product (or a food product precursor or food product constituent all herein collectively referred to as food product), it is understood the food product can be introduced from the feed tube, bags, line inlets, hoppers, bags or boxes located above, at or below a level of the food processor 10 or a portion of the food processor.

Although the food processor 10 is set forth in terms of a first food flow path 20 and a second food flow path 20', it is understood that an additional plurality of food flow paths can be employed such as three, four, five or more. As set forth below, the present disclosure is readily scalable to accommodate additional flow paths.

In certain configurations, the dispensing interface 26 includes at least one dispensing valve 28 for selectively passing or allowing passage of the processed food product from the food processor 10. In certain configurations, the dispensing interface 26 includes a plurality of dispensing valves 28, such as but not limited to one, two, three or more. It is contemplated that each food flow path 20 can include a dispensing valve 28 or a plurality of food flow paths can terminate at a given dispensing valve.

The food processor 10 can include any variety of devices, including but not limited to soft serve machines, batch freezers, slush freezers, shake freezers, blended ice machines or food processors for extruding food products which include flows, grains or meats as well as liquid dispensers for beverages including soft drinks, diary drinks or alcoholic beverages such as fermented or distilled spirits. Thus, the food product can be any corresponding product for consumption, wherein the food product may be subjected to processing that includes temperature control including but not limited to raising or lower a temperature, food product mixing, blending, altering, processing or extruding by the food processor 10. The food product can include precursor food products that change composition or consistency by virtue of being processed along the food flow path 20, wherein they can be converted to a processed food product.

The food processor 10 includes motors for driving the moving components as well as a refrigeration system, including a compressor and radiator as known in the art.

The food processor 10 also includes a controller 60 for selectively controlling the operation of the components of the food processor such as chillers or coolers, agitation components, pumps, motors as well as valving for flow control as set forth below. The controller 60 is generally known in the art and includes a processor for implementing instructions and a memory for storing instructions as well as acquired data. The programming of the controller 60 to perform the functions as set forth herein can be provided by commercially available controllers in food processors 10, including soft serve machines.

The food product passes, in a normal or forward direction along each food flow path 20, from the input end 22 to the output end 24. Thus, in terms of the normal or forward flow direction along each food flow path 20, each path includes an upstream portion and a downstream portion.

In certain configurations as seen in FIGS. 1 and 2, each food flow path 20 can incorporate a number of processing stations 40 intermediate the upstream or input end 22 (such as a reservoir or hopper 32) and the downstream or output end 24, (such as a dispensing valve 28). For example, the processing stations 40 can include mixing chambers and temperature control chambers, such as freezer chambers or barrels, along the food flow path 20. The mixing chambers include chambers for mixing ingredients provided in a stream as well as ingredients from different inputs such that the mixing chamber provides a volume for initial combination of different ingredients. The temperature control chambers can be used to heat the food product, wherein the heating merely changes temperature or imparts a chemical change in the food product. Similarly, the temperature control chamber as the freezer chamber, can reduce the temperature of the food product, or impart a chemical change. The freezer chamber can be alternatively referred to as the freezer barrel. The refrigeration system of the food processor 10 is typically thermally coupled to the processing station 40 as a temperature control chamber and in certain configurations, the hopper 32.

In further configurations, processing stations 40, such as the mixing chamber and/or temperature control chamber of FIG. 2 can include a blade or beater assembly 42 for agitation of the food product within the chamber, such as by rotation of the assembly within the chamber. Thus, the given processing station 40 can provide mixing, agitation and/or temperature control of the food product. With respect to the mixing or agitation, collectively referred to as mixing, it is understood the mixing can be accomplished by a fixed assembly, wherein the chamber rotates. That is, there is relative motion between the blade or beater assembly 42 and the chamber.

The processing station 40 includes an inlet 44 receiving food product from an upstream portion of the food flow path 20 and an outlet 46 for passing food from the processing station to the downstream portion of the food flow path. It is understood, the processing station can include a plurality of inlets 44 for receiving a plurality of components of the food product or receiving the food product from a plurality different sources. Similarly, the processing station 40 can include a plurality of outlets 46 for passing the food product to a plurality of different downstream processing stations or dispensing interfaces.

In certain configurations, the food flow path 20 terminates at a dispensing interface 26 which includes at least one dispensing valve 28 for selectively passing or allowing passage of the processed food product from the food processor 10. In certain configurations, the dispensing interface 26 includes a plurality of dispensing valves 28, such as but not limited to one, two, three or more. It is contemplated that each food flow path 20 can include a dispensing valve 28 or a plurality of food flow paths can terminate at a given dispensing valve.

Alternatively, each food flow path 20 can function primarily as a conduit from the input end 22 to the dispensing interface 26. In these configurations, the food processor 10 can function merely to selectively dispense the food product or can provide an alteration or conditioning of the food product such as temperature change, carbonation as well as mixing (compounding). Examples of the food processor 10 having these food flow paths 20 include dispensing devices such as automated soda dispensers, beer and wine dispensers.

It is further understood each food flow path 20 can include a plurality of inputs 22 with a corresponding smaller or a greater number of outputs 24 depending on the intending operating function of the food processor 10. The plurality of inputs 22 and plurality of outputs 24 can correspond to the number inlets 44 and outlets 46 of the processing station 40, or can be greater or smaller in number, depending on the configuration of the food processor 10.

Figure 3:
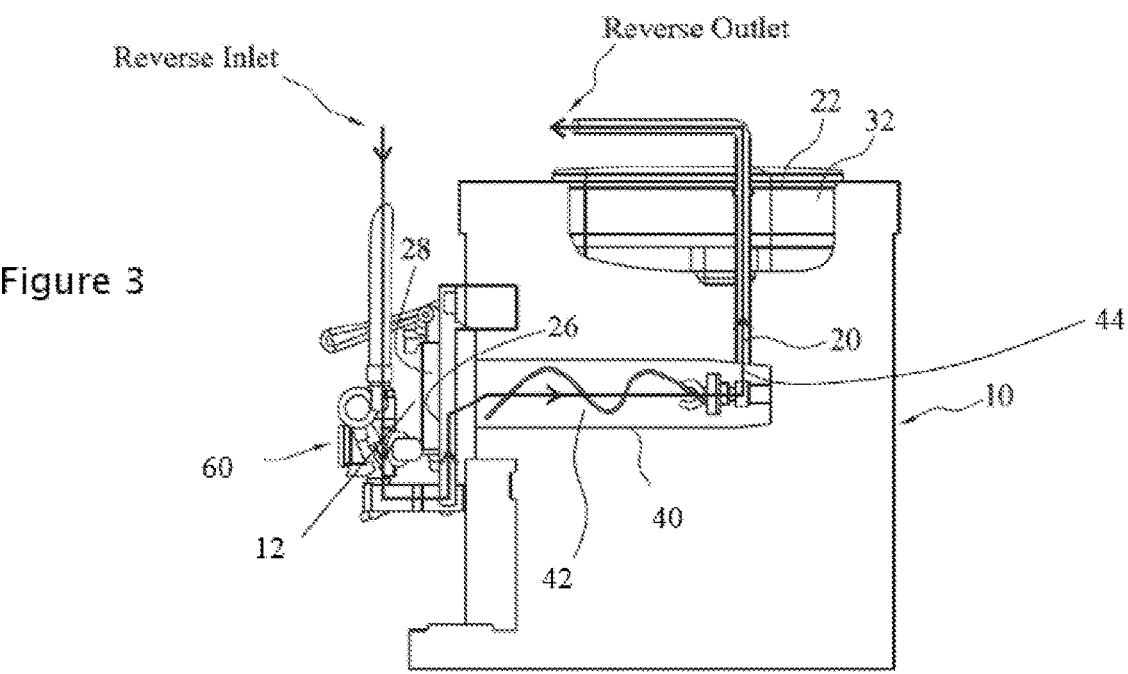
FIG. 3 is side elevational view of the food processor showing a reverse flow through the food processor.
Figure 4:
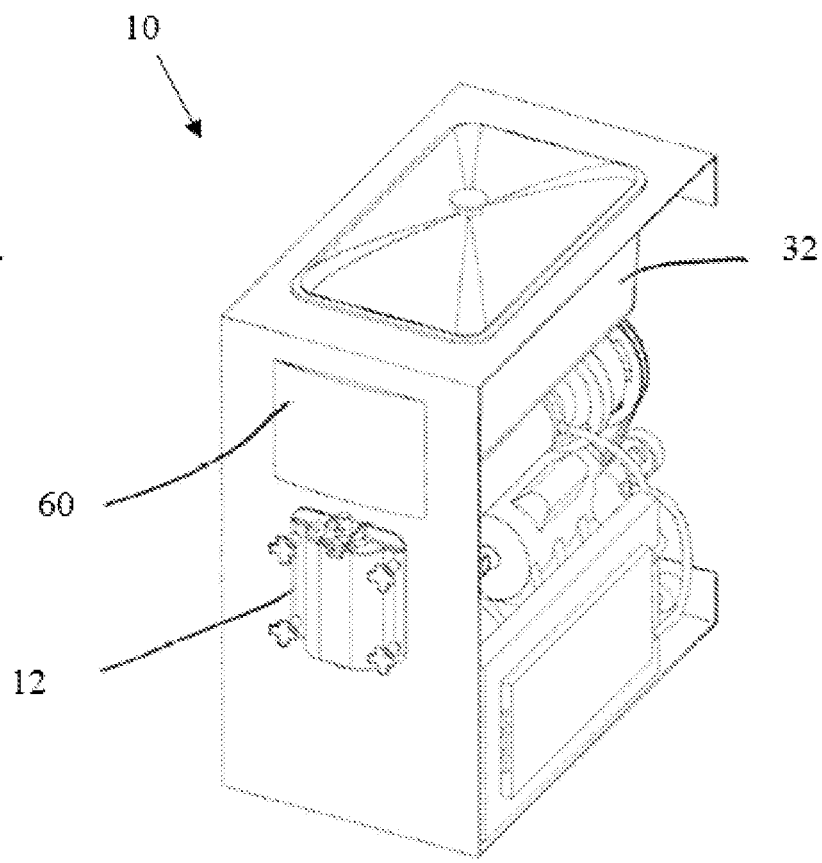
FIG. 4 is front perspective view of the food processor with a portion of an outer housing removed.
Figure 5:
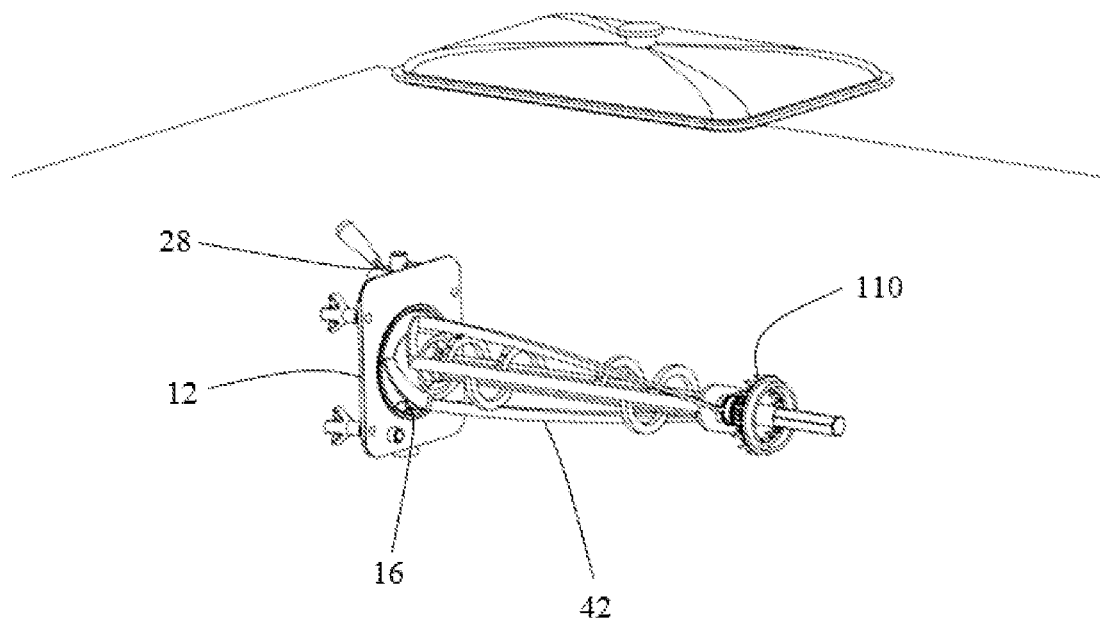
FIG. 5 is perspective view of a beater assembly for the food processor.

A representative food flow path 20 through the food processor, with the reverse direction indicated by arrows, is shown in FIG. 2. For purposes of illustration, a reverse direction or flow in the representative food flow path 20 is indicated by arrows in FIG. 3.

While the input or upstream end 22 of the food flow path 20 is shown in FIG. 2, above the output or downstream end, it is understood the input can be located below the output, wherein the food product is pumped up from a supply, hopper or reservoir 32 and along the food flow path to exit at the dispensing interface 26. For purposes of description, the reservoir, which can be integral, single use or multiple use is referred to as the hopper 32.

In one configuration of the food processor 10, the food processor includes a front door 12 movable between a closed, operating position and an open, maintenance or cleaning position. As known in the art, an interface between the door 12 and the freezer chamber 40 can include a seal or gasket, such as a peripheral chamber seal or chamber gasket 16. As seen in the Figures, in one configuration the door 12 operably retains other components of the food processor 10, such as the beater assembly 42 or a portion of the beater assembly. The door can form a sealed interface with a portion of the food flow path 20, such as a processing chamber 40, and in further configurations a freezer chamber. Thus, removal of the door 12 can provide access to the interior of the food flow path, such as the processing chamber 40, such as the freezer chamber, but as removed precludes operation of the processing chamber. The door 12 can define a portion of the food flow path 20. For example, the door 12 can retain the dispensing interface 26 and dispensing valves 28. Depending on the particular food processor 10, the door can be referred to as a freezer chamber door 12. The door 12 is movable between open position and a closed position, wherein the closed position of the door is an operable position, as the freezer chamber is sealed and the beater assembly 42 is operably retained. Further, in some configurations, removal of the door 12 is recommended or required by the manufacturer for routine cleaning (or sanitizing) of the food processor 10.

In certain instances of treating the food flow path 20, including but not limited to cleaning, rinsing, disinfecting, sanitizing, sterilizing or maintaining the food processor 10, a solution is passed through at least a portion of the food flow path 20.

The term solution is intended to encompass a cleaning, rinsing, sanitizing, disinfecting or sterilizing solution, as well as combinations or mixtures. The cleaning, rinsing, sanitizing, disinfecting or sterilizing referred to herein as treating. For purposes of description, the present system is set forth in terms of using the solution as a liquid, however it is understood the term solution encompasses cleaning agents as well as a single constituent solution such as but not limited to water (or other liquid) such as a rinse that may be employed. The term solution also includes a gas or vapor such as steam as well as other disinfecting gas. It is understood, the present system can employ any of a variety of cleaning, rinsing, sanitizing, disinfecting or sterilizing solution materials including liquids, gases and combinations thereof. The solution can be at least partly formed by an addition of an acidic or basic wash concentrate to public utility water. Exemplary acidic washes for the solution include citric, lactic, malic, acetic, adipic, fumaric, glutaric, tartaric, succinic, propionic, aconitic, sorbic, gluconic, ascorbic, and/or humic acids and at least one of sodium dodecyl sulfate and sodium lauryl sulfate.

The flow of the solution through the portion of the food flow paths 20 can be in the forward, normal direction or a reverse direction. The normal, or forward flow, originates at the input 22, or at least an upstream location spaced from the dispensing interface 26, and terminates at the output 24, or at least a downstream location nearer to the dispensing interface. That is, the normal direction includes the same direction as the food product to be dispensed flowing through the food flow path. The reverse flow, or reverse direction, originates at the output end 24, or at least downstream location (relative to the forward flow) and terminates at the input end 22, or at least an upstream location (relative to the forward flow). That is, the reverse flow flows opposite to the direction the food product passes through the food flow path during processing for dispensing from the food processor 10. The reverse flow encompasses flow in a reverse direction along a portion of the food flow path or along at least substantially the entire length of the food flow path.

The present system employs a continuous flow of solution through at least a portion of the food flow path 20 for treating, such as but not limited to cleaning, sanitizing, sterilizing, disinfecting or rinsing, the portion of the food flow path. That is, in the continuous flow, the flow can move unimpeded by closed valves or shut-offs acting on the food flow path 20. Thus, continuous flow can include a flow that is introduced into the food flow path 20 but has not yet reached an exit point or drain, because a sufficient volume has not yet been introduced. It is understood flow for treating can be through the entire food flow path 20 or at least a portion of the food flow path. The continuous flow can be varied but is cumulatively sufficient to treat the respective portion of the food flow path. The continuous flow is sufficient to dislodge particulate matter from the surfaces of the food flow path and entrain the particulate matter into the flow. As set forth below, the continuous flow has a predetermined flow rate, temperature and flow duration, or range for each of these parameters.

Depending upon the particular configuration of the food flow path 20, such as cross sectional area, the continuous flow of solution can be from 0.5 gallons per minute (gpm) to 1 gpm to 1.5 gpm to 2 gpm to 2.5 gpm (+/−0.5 gpm) to 3 gpm (+/−0.5 gpm) or more. In select configurations, the solution flow rate is selected to provide the set forth functions as well as reduce water consumption as compared to manufacturer recommended procedures.

As seen in FIGS. 2 and 6-8, the present food processor 10 can include an optional primary drain port 70 in the food flow path 20 between the input end 22 to the output end 24, and in certain configurations between the hopper 32 and the dispensing valve 28, and in other configurations between the processing station 40 and the dispensing valve 28, and in select configurations the primary drain port is located in at least one of the processing stations. Thus, the drain port 70 can be upstream of, downstream of, or located within the processing station 40. In one configuration of the food processor 10, the primary drain port 70 is in at least one of the food flow path 20 and the processing station 40, such as the freezer chamber. The primary drain port 70 can be separate from the inlet 44 and the outlet 46 of the respective processing station 40 and distinct from the dispensing of the food product from the food processor 10 in the normal production manner through the dispensing interface 26.

As seen in FIGS. 6-8, 12 and 17-19 select configurations of the food processor 10 include a flow control valve 54 intermediate the reservoir, feed tube, line inlet 22 or the hopper 32 and the processing station 40. The flow control valve 54 is moveable between a closed position precluding flow from the hopper 32 to the processing station 40 and an open position permitting flow from the hopper to the processing station. Thus, the flow control valve 54 can function as an isolating valve for selectively isolating a first portion of the flood flow path 20 from a second portion of the food flow path. By isolating a first portion of the food flow path 20, flow between the first portion and a second portion of the food flow path is terminated.

In a further configuration the dispensing valve 28 can be spaced from the upstream processing station 40 by a section of tubing, such as a spacer, in the food flow path 20. In these configurations, the primary drain port 70 can be located in the spacer.

In yet further configurations of the food processer 10, the primary drain port 70 can be downstream of the dispending valve 28 or can be defined by the dispensing valve.

The primary drain port 70 can be fluidly connected to a primary drain line 72. The primary drain line 72 includes an internal portion and can terminate at either a fitting for connection to an external drain or include sufficient length to reach the external drain. The drain port 70 can be fluidly connected to an internal drain, such as a reservoir or sump, which can be removable from the food processor 10 or configured to be pumped out, as known in the art.

The primary drain line 72 includes valving to isolate the primary drain line from the food flow path 20. Specifically, the primary drain line 72 includes a primary drain valve 74 for selectively passing fluid, including food product, from the food flow path 20 through the primary drain line. While the primary drain valve 74 can be spaced from the primary drain port 70, in one configuration the primary drain valve is at the primary drain port and can functionally define the primary drain port.

The food processor 10 further includes a solution input line 80 for presenting a solution, which can include or function as a motive fluid introduced to the food flow path 20. The solution input line 80 can introduce the solution into the food flow path at the upstream end to flow through at least a portion of the food flow path in a forward direction; at the downstream end to pass the solution through at least a portion of the food flow path in the reverse direction; or intermediate the upstream end and the downstream end, wherein the solution can pass through at least a portion of the food flow path in the forward direction or the reverse direction or both. In one introduction of the In one configuration, the solution input line 80 connects to the primary drain line 72 at a solution input valve 82. The solution input line 80 includes an interface 84 for fluidly connecting to a source of pressurized water such as a public utility water or an integral reservoir. As set forth below, the solution input line 80 can be used to deliver the solution to the food flow path 20.

Figure 7:
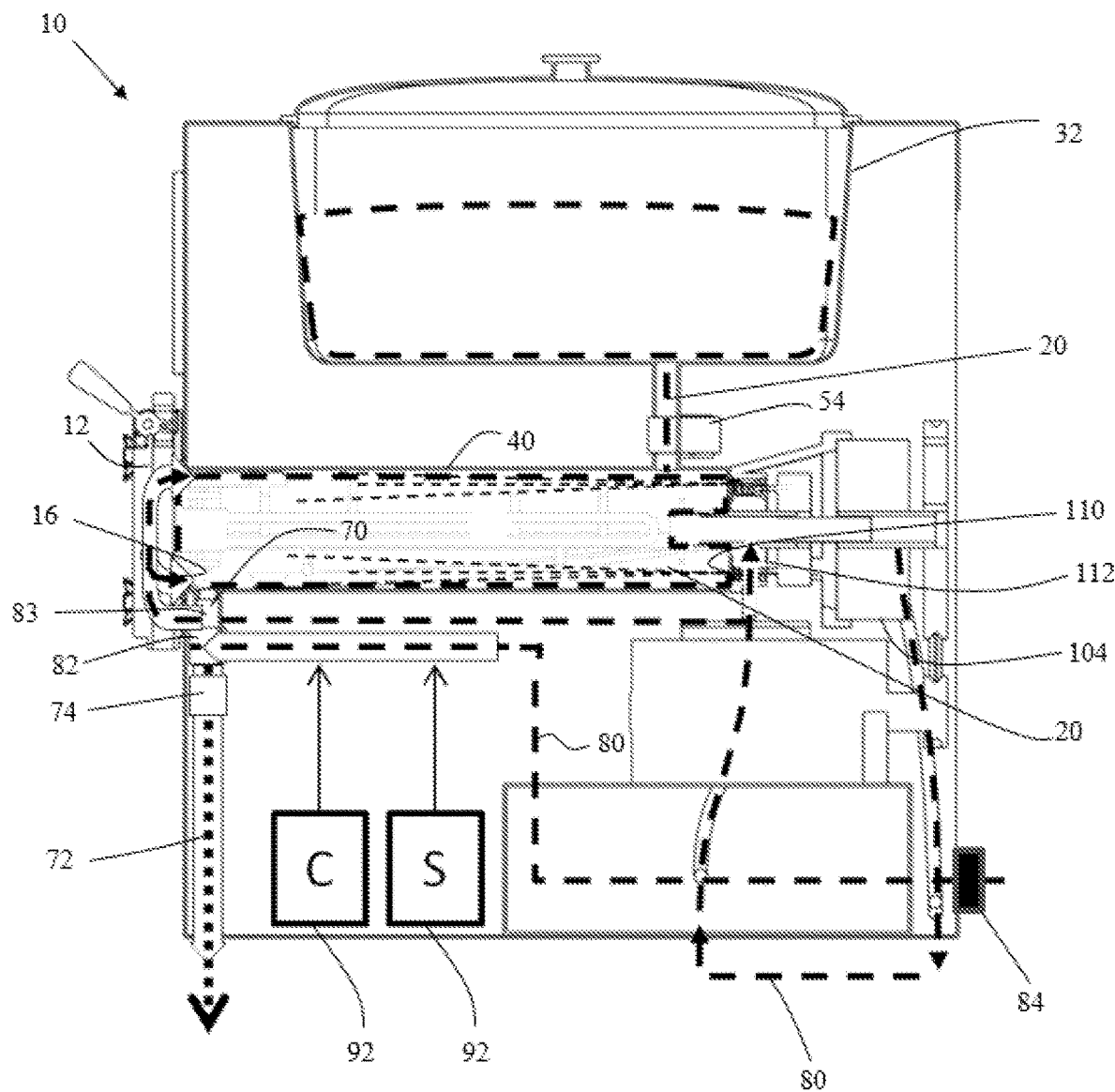
FIG. 7 is a cross sectional view of a further configuration of the food processor showing alternative solution flow path.

Referring to FIG. 7, the solution input line 80 can include a port 83 at the door seal (door gasket 16), wherein during normal operation of the food processor 10 the gasket seals the solution input line from food flow path 20. However, upon sufficient fluid pressure in the solution input line 80, the gasket 16 is partially unseated to admit solution into the food flow path 20 such as at the freezer chamber 40. Alternatively, the solution input line 80 can interface directly with the freezer chamber 40, including via a valve.

The source of solution, can be internal to the food processor 10, external to the food processor or a combination of internal and external components. For example, in the internal configuration, the food processor 10 can include a solution reservoir within the food processor, wherein the solution reservoir is sized to retain a sufficient volume of the solution to perform the intended operation on or treatment of the food flow path 20. In the external configuration, the solution input line 80 can function as a solution source, which is selectively connectable to the food flow path 20. In the combination configuration, the food processor 10 can include a solution concentrate or component reservoir(s) 92 from which a concentrate, component or additive is selectively entrained into a flow in the solution input line 80 which is then introduced into the food flow path 20. In a further configuration, the flow control valve 112 can be pressure actuated, such that in response to a predetermined pressure acting on the flow control valve, the flow control valve is moved to an open position permitting flow there through.

It is understood the solution reservoir and the solution concentrate reservoir 92 can be a single reservoir or a plurality of reservoirs corresponding to the intended solutions to the introduced into the food flow path 20. That is, there may be a separate cleaning solution and separate sanitizing solution as well as a rinse solution with corresponding cleaning solution concentrate reservoir, sanitizing solution concentrate reservoir, and rinsing solution concentrate reservoirs 92.

The reservoir of solution or the solution concentrate reservoir 92 can be pressurized to provide the motive force for the introduction of the solution into the food flow path 20 or the combination of the components into the solution. The pressurization can be accomplished by any of a variety of know mechanisms including bottled gas as well as compressor pumps, liquid pumps or any commercially available pump either independent of the food processor 10 or integral with the food processor, wherein the pressurization (pumps) are operably connected to the controller 60 for establishing the requisite solution flow rate. For example, the solution input line can include the pump that is connected to the controller. The combining of the solution concentrate with the motive fluid can be accomplished by a variety of mechanisms including but not limited to a metering pump, having a given volume per stroke or cycle as well as in-line dispensers for dispensing in response to flow or by a venturi as well as direct user introduction.

The communication of the respective solution concentrate reservoir 92 and the solution input line 80 (solution input line) can be valved to preclude or permit flow in accordance with the intending operations. The valving can be operable controlled by the controller 60. The control can be by virtue of individual valve control or implementation of a procedure or protocol involving a plurality of valve controls and associated timing.

The pressure of the introduced solution, acting as a motive fluid, is typically between 5 psi and 80 psi. It is believed a motive pressure of between 12 psi and 30 psi is adequate, with a range of 16 psi to 20 psi being sufficient and compatible with many commercial soft serve machines. The pressure can be provided by municipal, utility water supply or by the mechanisms set forth above either directly or in conjunction with a pressure regulating valve. Thus, in certain configurations, the food processor 10 can include a pressure sensor operably connected to a portion of the food flow path exposed to the introduced solution (or the solution input line 80) and the controller 60.

Certain configurations of the food processor 10 also include a secondary drain port 120 in the food flow path 20. The secondary drain port 120 is fluidly connected to a secondary drain line 122. The secondary drain line 122 can pass to an external drain or an internal storage for subsequent disposal or recycling or connect to the primary drain line 72.

While the secondary drain port 120 can be disposed at a variety of locations along the food flow path 20, in one configuration, the secondary drain port can be incorporated into the flow valve 54 intermediate the hopper and the processing station 40. For example, the flow valve 54 can be a three way valve set, wherein two of the ports interface with the food flow path 20 and the third port is the secondary drain port. Thus, the three way flow valve set can be positioned (i) to provide flow along the food flow path 20 while blocking the secondary drain port, (ii) to preclude flow along the food flow path through the valve and maintain the secondary drain port 120 closed or (iii) to preclude flow along the food flow path through the valve while permitting flow from a portion of the food flow path through the secondary drain port.

Alternatively, the flow valve 54 and a separate secondary valve 124 can be employed to provide the recited flow control between the reservoir, hopper 32 and the processing station 40, wherein depending on the specific configuration of the food processor either valve could function as a drain valve for passing material from the food flow path 20 or an introduction valve for introducing material into the food flow path.

While the food processor 10 is shown with the solution input line 80 connected to a municipal water supply, it is contemplated the food processor can include a motive flow reservoir and a pump 104 or just the pump communicating with the solution input line 80 for providing the motive flow in the solution input line 80. As with the valving of the food processor 10, the pump can be operably connected to the controller 60.

As portions of the primary drain line 72, the secondary drain line 122, the drain port 70, the access port 100, the nozzle head 110 and solution input line 80 are proximal to the freezer chamber 40, these portions that retain solution can be exposed to below freezing temperatures and hence freeze, thereby obstructing or blocking respective flows. The food processor 10 can include a circulating loop 130 in thermal contact with these portions of the food processor 10 for circulating a fluid, in either a closed loop or as a portion of the solution flow. The circulation in the circulating loop 130 is configured to reduce or prevent freezing with these portions of the food processor 10.

It is contemplated the pump 104 can function as a circulating pump, shown in FIGS. 9-12, 14 and 15 can be used to provide circulation through the circulating loop 130. However, it is understood a separate pump can be employed as a circulating pump.

Figure 10:
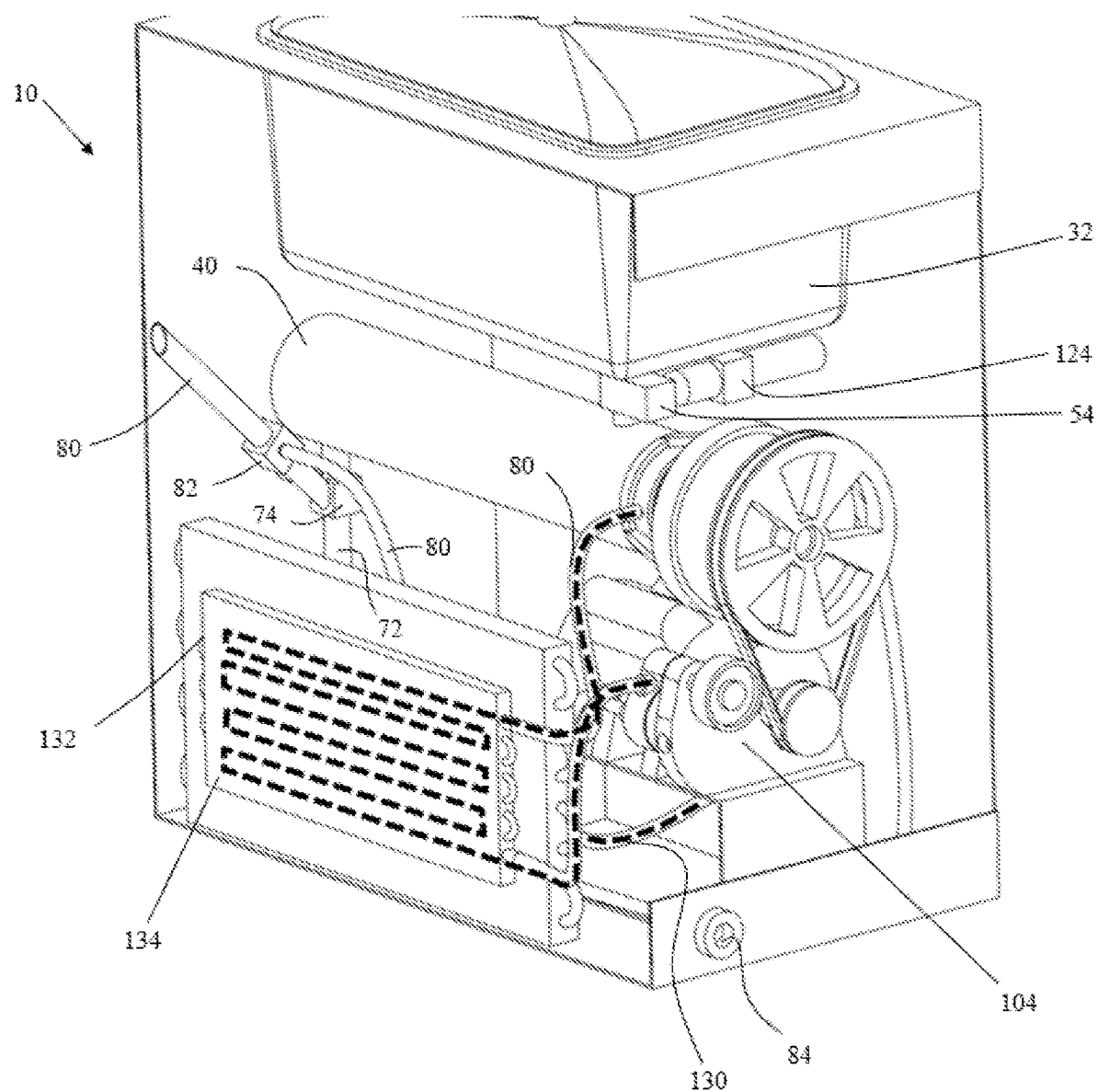
FIG. 10 is a perspective view of a configuration of the food processor showing a circulating pump fluidly connected to a heat exchanger.

As seen in FIG. 10, it is further contemplated the circulating loop 130 can be thermally coupled to a heater 132 for selectively controlling the temperature of the solution, or the circulating liquid in the circulating loop. That is, it is contemplated the circulating loop 130 can be define a portion of the solution input line 80 or be fluidly connected to the solution input line. A flow control valve 136 can selectively fluidly connect the circulating loop 130 and the solution input line 80 so that residence time of the solution within the circulating loop can be controlled to ensure efficacy of the heated solution. It is further contemplated, the circulating loop 130 can be a closed loop, separate from the solution input line 80.

The heater 132 can be a dedicated heater, such as a resistive heater or a thermal jacket, such as a water jacket, operably connected to the controller 60 or manually controllable. In another configuration, the heater 132 is a heat exchanger 134 thermally coupled to the existing radiator of the food processor 10 for harvesting waste heat from the standard motors or compressors of the food processor 10.

The temperature of fluid in the circulating loop 130 can thus be maintained above a freezing temperature or even at an elevated temperature depending upon intended operating parameters. The circulating loop 130 can include valving for selectively bypassing the heater 132 so as to provide temperature control of the circulating loop. The circulating pump 104 and valving can be operably connected to the controller 60 for maintaining the desired temperature within the circulating loop 130 or the thermally connected portions of the drain lines and solution paths.

In one configuration of the food processor 10, the pump 104 can function as an auxiliary pump operably connected to the controller 60 and one of the lines carrying the solution in the solution input line 80, wherein the auxiliary pump can induce a sufficient flow within the line carrying the solution to substantially precluding freezing of the solution within the line during intended operating parameters of the food processor 10. Alternatively, the pump 104, typically under direction of the controller 60, can be used to induce circulation in the lines carrying solution. It is further contemplated, a separate auxiliary pump can be employed, separate from the pump 104.

Figure 11:
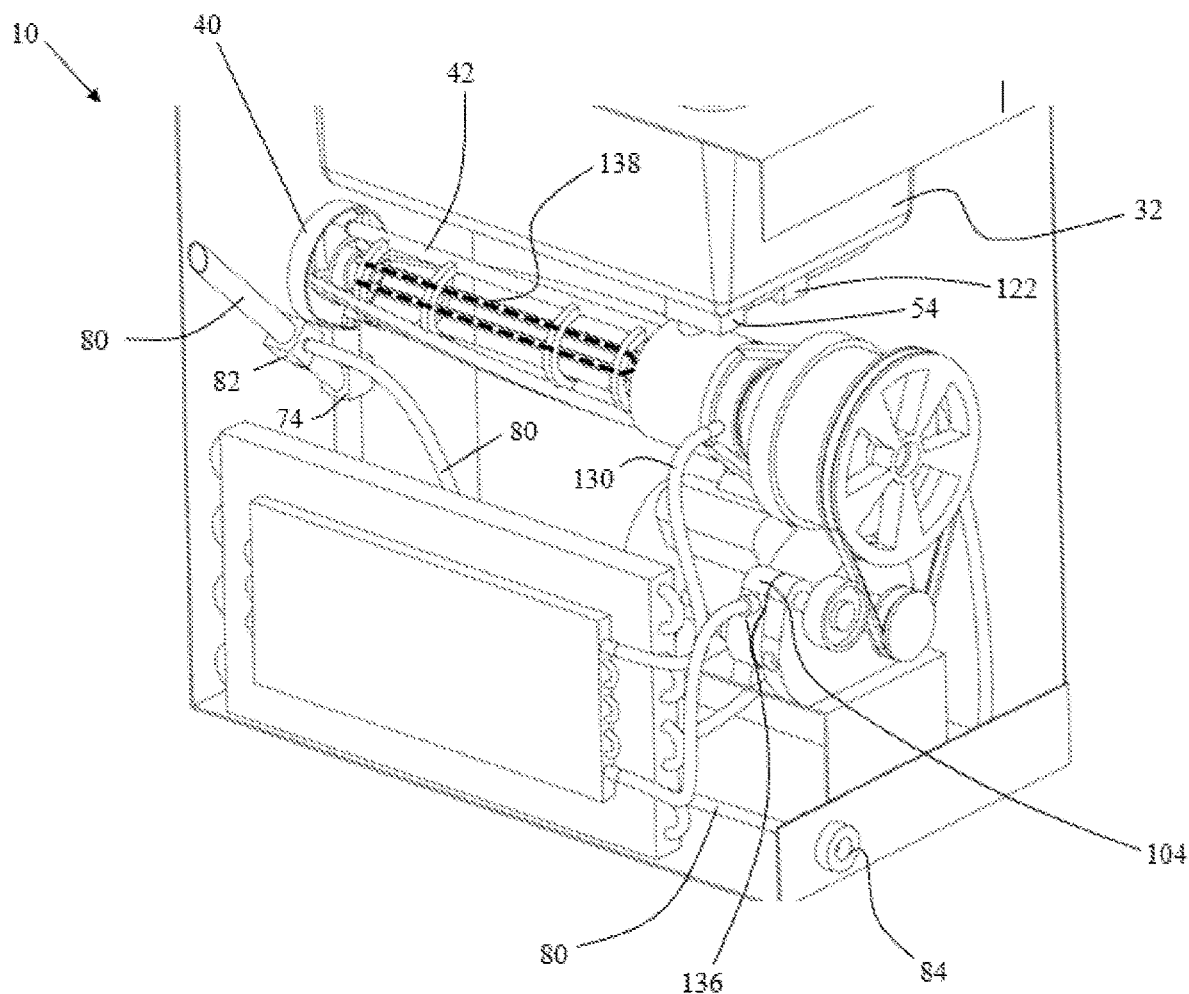
FIG. 11 is a perspective view of a configuration of the food processor showing a heater in a beater assembly.

Referring to FIG. 11, in a further configuration, the processing station 40 can include a heater 138 for heating food product within the processing station. The heater is operably connected to the controller 60 for selective actuation under the control of the controller. In one configuration, the heater 138 is incorporated within the beater assembly 42. The heater 138 can be a resistive heater, a heat exchanger or thermally coupled to a heat exchanger 134 or fluidly connected to the circulating loop 130 for selective thermal control by the controller 60.

The temperature of the introduced solution flow is preferably elevated to above room temperature. In certain configurations, the temperature of the solution is at least 80° F., and in further configurations at least 100° F. (+/−5° F.) and in other configurations the temperature is between 105° F. and 120° F. (+/−5° F.), and in one configuration with an available temperature of 112° F. (+/−5° F.). It is further contemplated that the temperature of the solution flow may be used to inhibit or reduce or eradicate biofilm formation or existence within the flood flow path 20. Thus, the temperature of the solution can be raised to inhibit or eradicate a biofilm. For example, temperatures may be 165° F. (+/−5° F.); 175° F. (+/−5° F.); 185° F. (+/−5° F.); to 195° F. (+/−5° F.); or 205° F. (+/−5° F.). The flow duration is then partly defined by the actual temperature of the solution and the extent or composition of the biofilm.

Thus, the food processor 10 can include a temperature sensor thermally coupled to the food flow path or the solution input line 80, wherein the temperature sensor is connected to the controller 60. Either or both the heaters 132, 138 can be thermally coupled to the solution input line, wherein the controller can establish a temperature of the solution introduced into and flowing through at least a portion of the food flow path. Alternatively, an external source of the solution, or water comprising a portion of the solution can provide temperature regulated water, such as hot and cold water supplies, the controller 60 can regulate the respective supplies to provide the desired temperature of the solution flowing through the food flow path.

Figure 12:
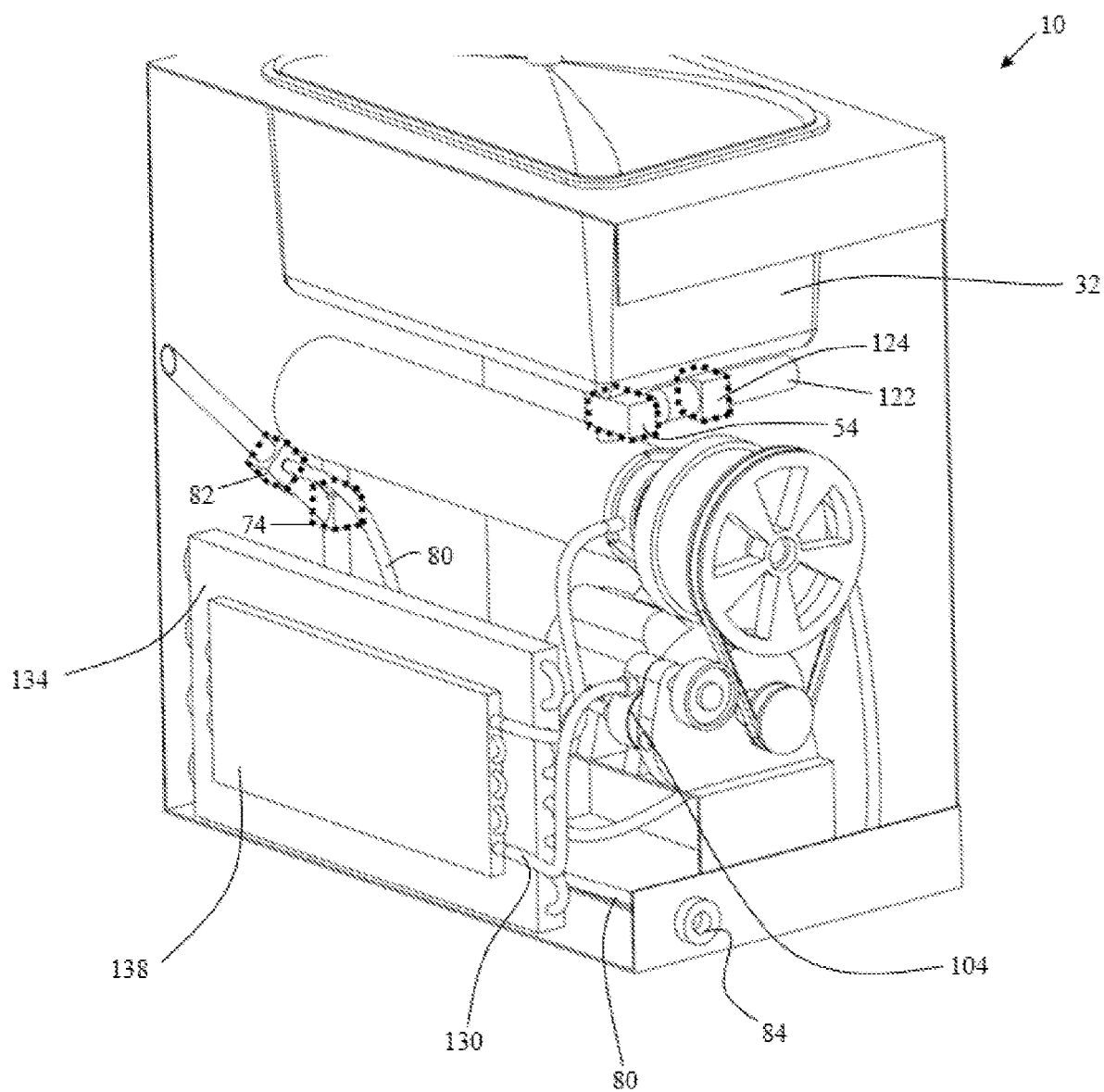
FIG. 12 is a perspective view of a configuration of the food processor showing a plurality of flow control valves.
Figure 13:
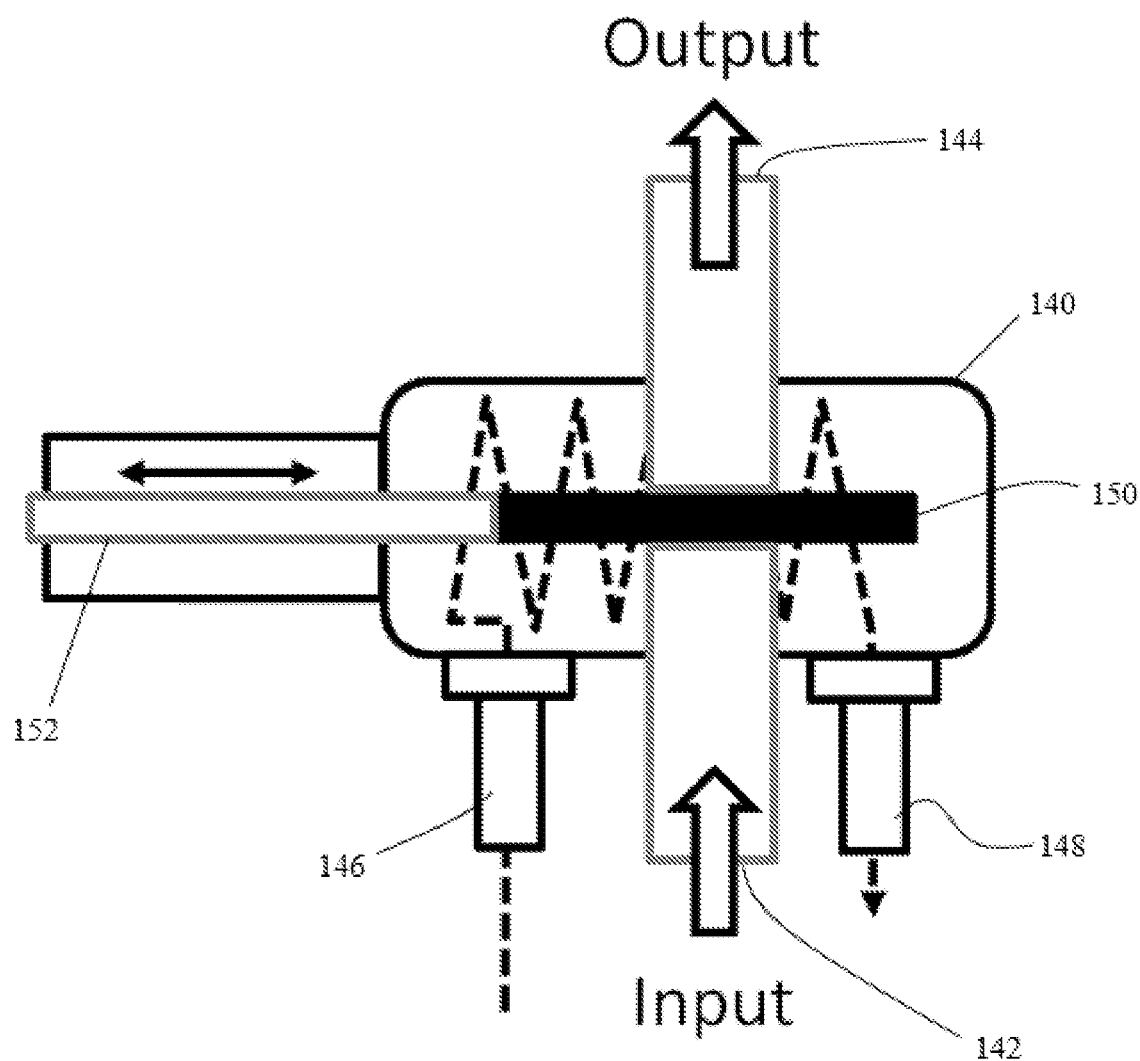
FIG. 13 is a schematic representation of a self-cleaning valve assembly for flow control in the food processor.
Figure 14:
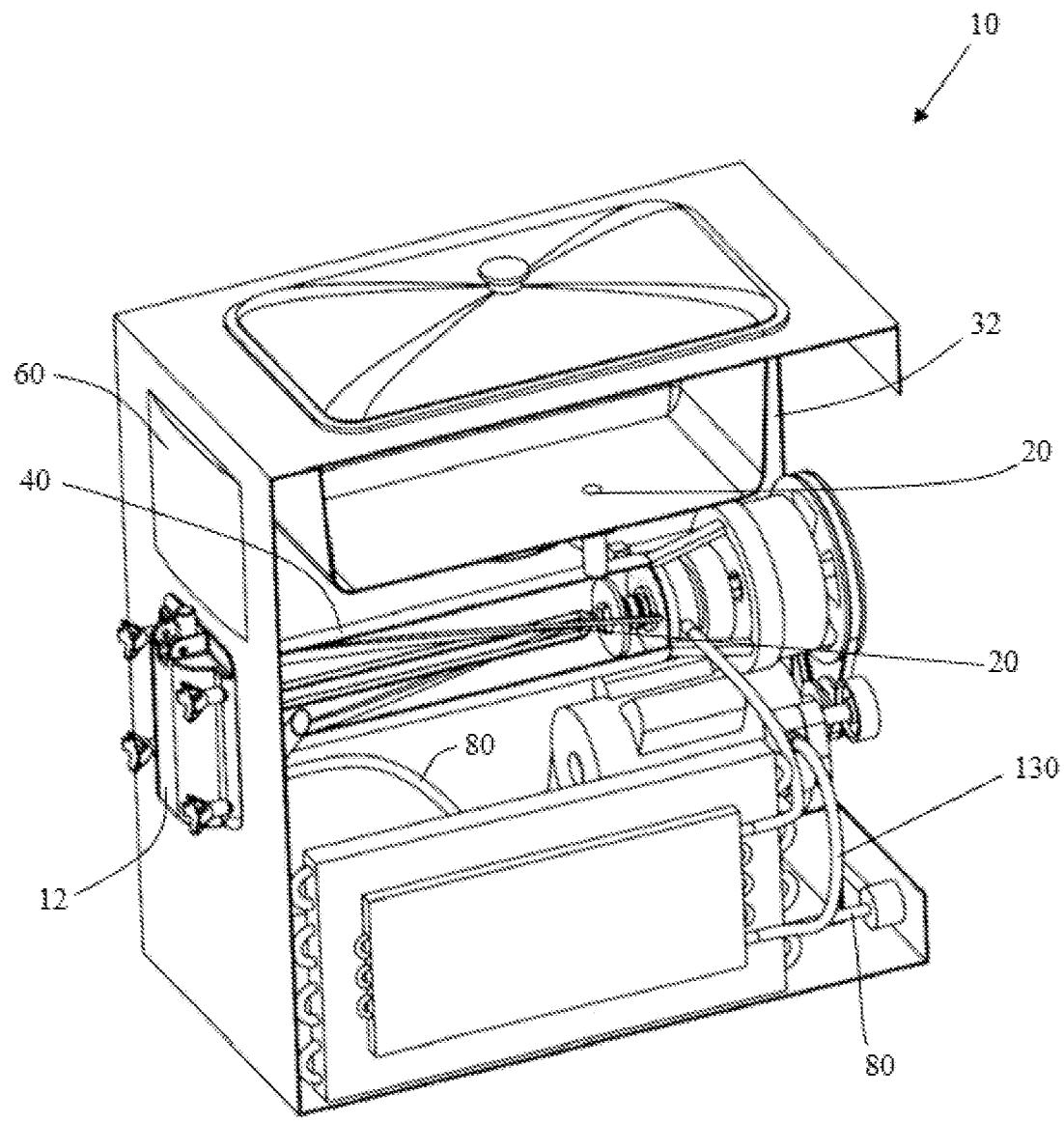
FIG. 14 is a perspective view of a configuration of the food processor showing a circulating loop between a heat exchanger and a portion of the food flow path, such as a freezer chamber.
Figure 15:
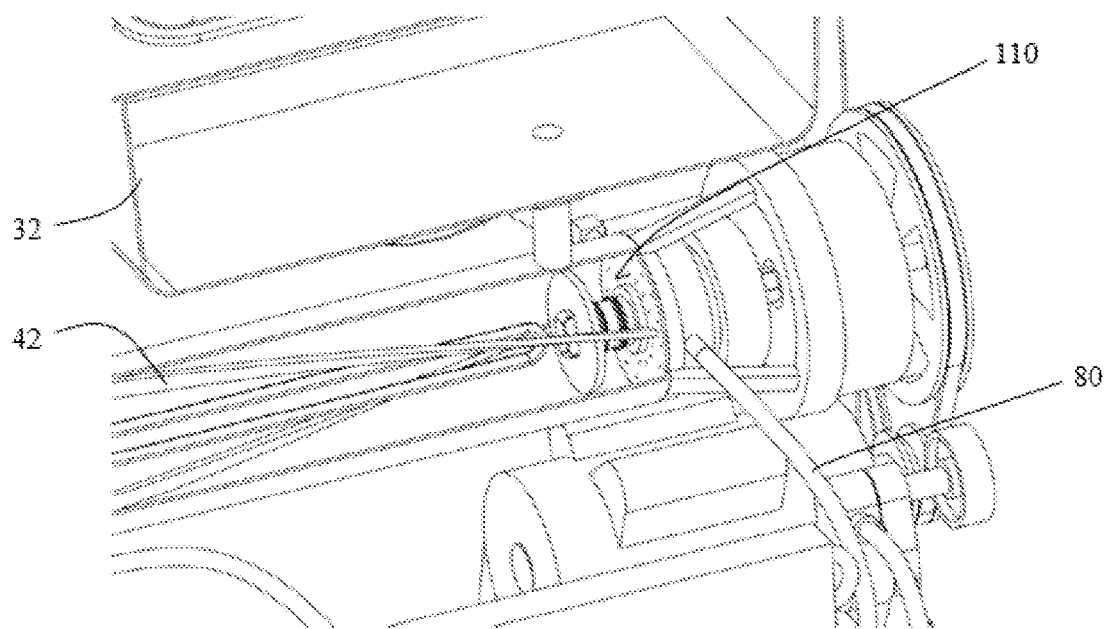
FIG. 15 is a perspective view of a configuration of the food processor showing a nozzle head for introducing a solution in a freezer chamber.
Figure 16:
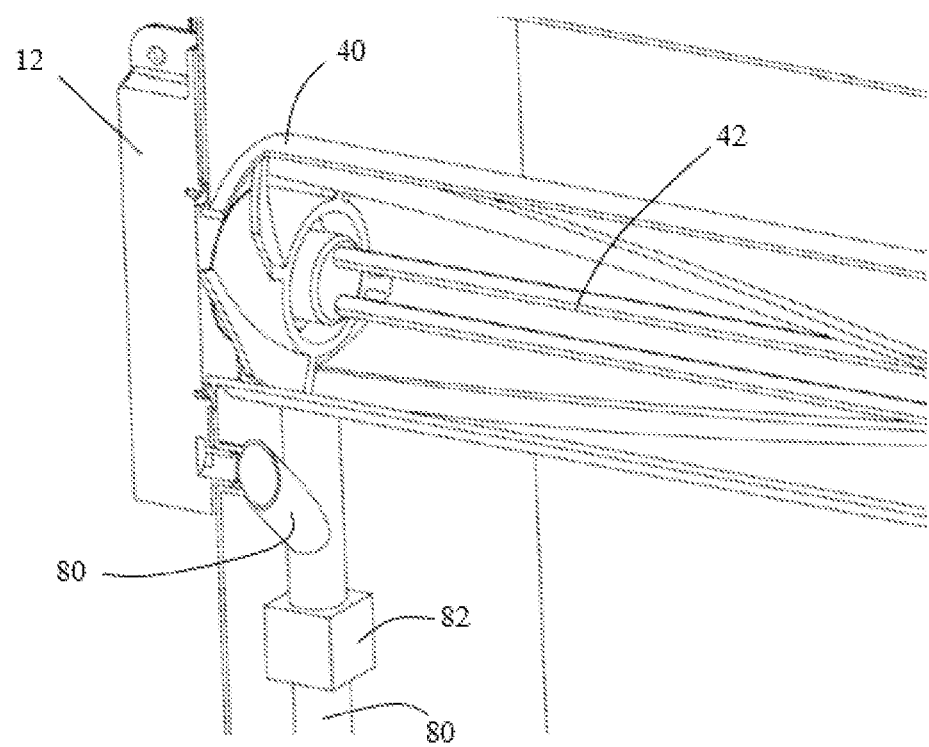
FIG. 16 is a perspective view of a configuration of the food processor showing a drain port in a freezer chamber.

The flow control valves which are exposed to the food product can be substantially self-cleaning. Referring to FIGS. 12 and 13, the flow control valves can be fluidly connected to solution input line 80 to expose an internal surface of the valve to the solution. Specifically, the flow control valves include a valve housing 140 having an inlet 142 and an outlet 144. A valve body 150 is exposed to an interior of the valve housing and selectively movable between a first position precluding flow between the inlet 142 and the outlet 144 and a second position permitting flow between the inlet and the outlet. The valve body 150 can be operably located by an actuator 152 connected to the controller 60. The actuator 152 can be any of a variety of motion control devices known in the art, including but not limited to solenoids, pistons, pneumatic or hydraulic cylinders, linear actuators or electric servos. The valve housing 140 also includes a solution inlet 146 and a solution outlet 148 configured to expose the interior of the valve housing 140, as well as the portion of the valve body 150 exposed to food product (and selectively to the solution). Thus, the valve body 150 can be selectively exposed to the solution as part of a maintenance or operating parameters of the food processor 10. The solution inlet 146 and solution outlet 148 can be fluidly connected to the solution input line 80 directly or through a valve.

FIG. 12 shows the location of the self-cleaning flow control valves. Specifically, such flow control valve can be operably located in the food flow path 20 between the hopper 32 and the processing station 40 and along the primary drain line 72 downstream of the primary drain port 70 and along the solution input line 80. Alternatively, an in line valve can be created by locating a peristaltic pump within the food flow path or a line connected to the food flow path, such as the solution input line 80. The peristaltic pump operates in conjunction with a flexible or compliant section of the path or line such that the path or line is opened and closed by means of a shoe, wiper, lobe or roller acted upon by a rotating/linear motor or solenoid mechanism. This form of valve allows for self-cleaning while the solution circulates and/or continuously flows through the system. Thus, by selectively stopping the peristaltic pump at a position where the line is closed off, the peristaltic pump acts as a valve. By actuating the peristaltic pump to allow the path or line to open and then terminating movement of the pump, then path or line is left open. The relative position of the portion of the peristaltic pump that deforms the path or line can be sensed or monitored to allow the controller 60 to operate the pump as an on/off valve within the food dispenser 10.

In a further configuration, the hopper 32 is a substantially closed volume incorporated within the food processor 10. It is contemplated such configuration of the food processor 10 having the incorporated hopper, the hopper 32 can be integral with the food processor or can be operably connected, but selectively separable. In this configuration, such incorporated hopper 32 does not have a substantially open top with a lid, but rather includes a port for receiving food product. The port can also function to pass solution from the food processor.

Alternatively, the hopper 32 can be configured as known in the art, wherein the hopper has a substantially open top which has a cross section substantially equal to the foot print of the hopper 32. A lid is releasably connected to the hopper 32 for closing the hopper as well as permitting access to the interior of the hopper for maintenance or cleaning.

Figure 17:
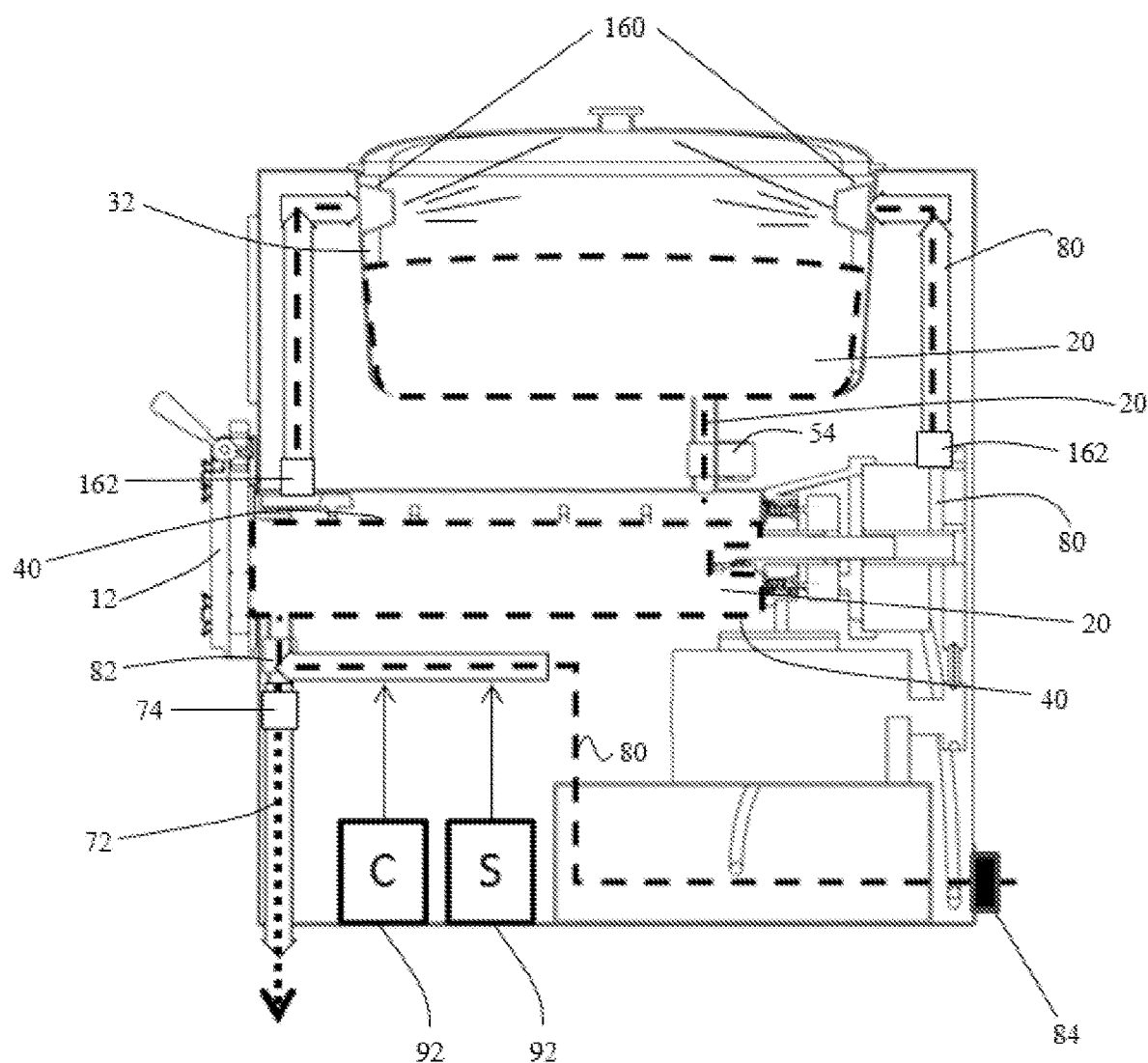
FIG. 17 is a cross sectional view of a further configuration of the food processor showing a further solution flow path.

The hopper 32 can also include a spray head 160 connected to the solution input line 80 for introducing solution into the hopper 32 with sufficient coverage and velocity to provide necessary treating such as cleaning, rinsing, disinfecting, sterilizing or sanitizing of the internal surfaces of the hopper. For example, as seen in FIG. 17, the hopper 32 includes at least one, but can include a plurality of spray heads 160 for introducing the solution into the hopper 32. The solution input line 80 is selectively connected to the spray heads 160 through flow control valves 162.

It is further contemplated the food processor 10 can include a variety of sensors know in the art, such as temperature sensors, flow sensors (for sensing a flow rate), ph sensors, clarity or flow content sensors typically operably connected to the food flow path 20, the solution input line 80 or the drain lines 72, 122 and which can be operably connected to the controller 60 for verifying or monitoring or initiating the protocols implementable by the controller (or the food processor).

The food processor 10 with the controller 60 and the associated pumps and pressure regulating valves are configured to provide a flow rate through the relevant portion of the food flow path 20 of at least 1 gallon per minute (gpm) (+/−0.5 gpm) and in certain configurations 1.5 gpm (+/−0.5 gpm), with further configurations using 2 gpm (+/−0.5 gpm) or 2.5 gpm (+/−0.5 gpm). Depending on the particular sizing of the food flow path in the food processor, it is understood, the flow rate could be between 3 gpm and 8 gpm (+/−1 gpm).

Figure 6:
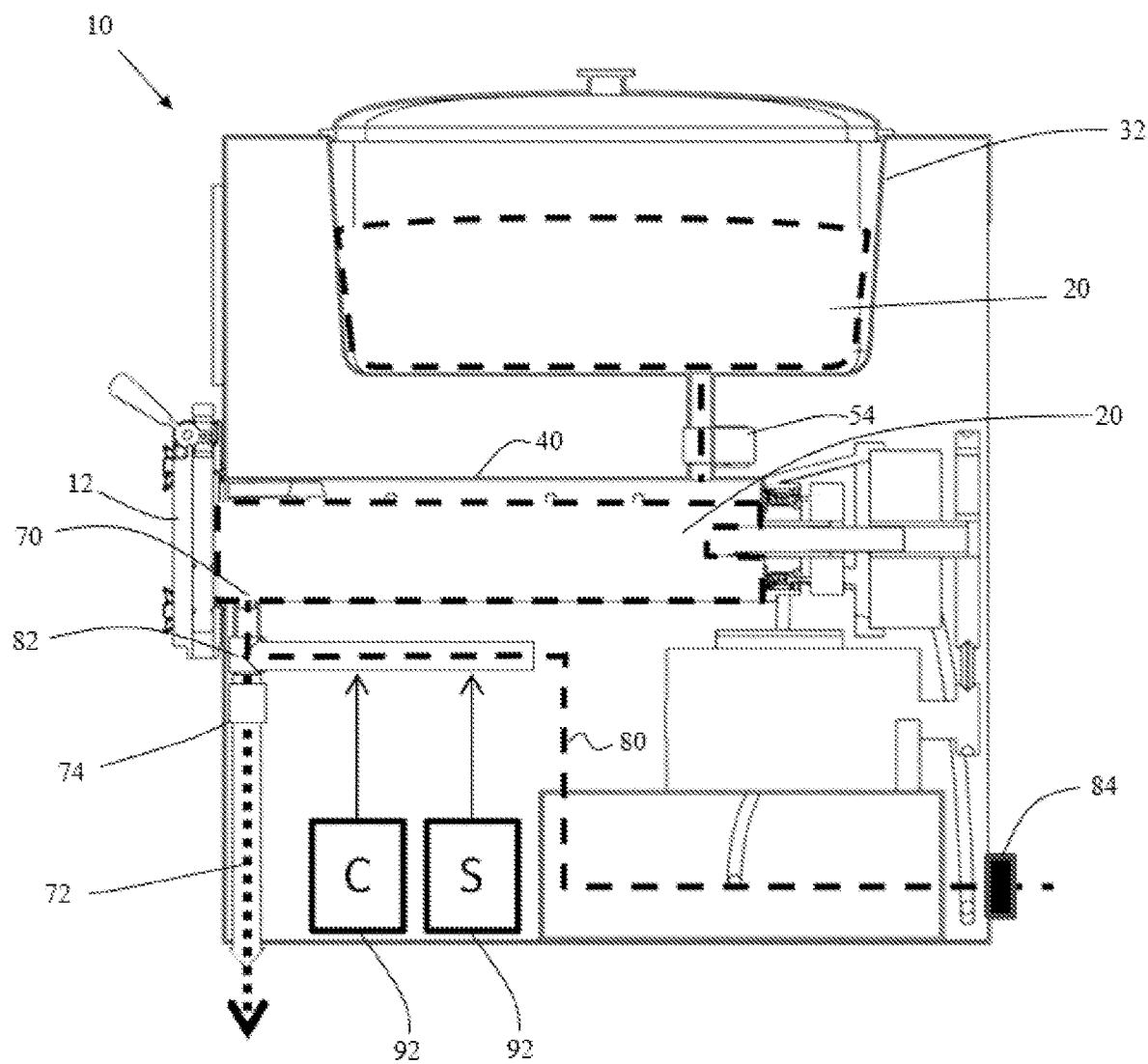
FIG. 6 is a cross sectional view of a configuration of the food processor showing a solution flow path.

Referring to FIG. 6, in operation of one configuration, the food product in the food flow path 20 within the processing station 40 is removed. The food product is removed from the processing station 40 by disposing the flow control valve 54 in a closed position to block flow in the flow path 20 and isolate food product upstream of the processing station 40 (or at least preclude further introduction of food product into the processing station), while exposing the processing station to atmospheric pressure to break any vacuum within the processing station. It is contemplated the food flow path 20 can be exposed to or include a check valve for selectively exposing a portion of the food flow path 20 to atmospheric pressure. The valve can be a one-way check valve, which in select configurations is operably connected to the controller 60. The primary drain valve 74 is opened, allowing liquid (such as food product or solution) to drain through the primary drain line 72. Flow in the circulating loop 130 can be initiated (i) to facilitate a temperature change of the food product in the food flow path 20, such as melting the food product to flow through the primary drain port 70 or (ii) to assist through an increase in solution from the solution input line 80.

The food product can drain through the primary drain valve 74 primarily driven by gravity, such as a free flow or can be pressure assisted by a positive pressure upstream or a negative pressure downstream, such as by the solution input line 80 providing a motive fluid.

The processing station 40, such as the freezer chamber, can then be pre-rinsed. The primary drain valve 74 is closed, precluding passage along the primary drain line 72. The solution input line 80 is fluidly connected to the food flow path 20 at the processing station 40 by opening the solution input valve 82 for a predetermined time period (or flow volume). Solution thus passes from the solution input line 80 through the primary drain port 70 in the configuration of FIG. 6, to at least partially fill the processing station 40 with solution. Upon filling the processing station 40 with a predetermined volume of solution, the solution input valve 82 is closed, and the solution begins a residence time in the processing station 40. During the residence time, the solution in the processing station 40 can be substantially static or can be agitated, such as by operating the beater assembly 42. The amount of residence time and amount of agitation can be set by the controller 60 through control of the beater assembly 42 and the flow control valves.

The primary drain valve 74 is then opened, such as under the direction of the controller 60, allowing the solution to pass from the processing station 40. Again, draining through the primary drain port 70 can be free flow or pressure assisted. This cycle of filling, residence time (with or without agitation) and draining can be repeated as necessary to provide the desired treatment in view of the composition of the solution, the machine configuration and any governing regulations or operating procedures for the food processor 10.

Subsequently or alternatively, a continuous solution flow is imparted through at least a portion of the food flow path with the door 12 remaining in the closed, operable position, such as the processing station 40. The solution can continuously pass from the solution input line 80 through the primary drain port 70 in the configuration of FIG. 6, with the door 12 in the closed position. The temperature, flow rate and duration of the continuous solution flow are controlled by the controller 60. In one configuration, a continuous flow of at least 1.5 gpm introduced at to the food flow path with a temperature of at least 100° F. for at least 1 minute. In further configurations, a continuous flow of 2.5 gpm (+/−0.5) at a temperature of 112° F. (+/−5° F.) for 2 minutes to 4 minutes is established. The continuous flow can be in a forward or reverse direction though the portion of the food flow path.

It is further contemplated, the solution can be exposed to the heater 132 for temperature regulation or control before introduction into the food flow path 20, such as the processing station 40.

Thus, by providing a predetermined duration of the continuous solution flow, portions of the food flow path 20 can be exposed to a residence time of the solution.

In addition, the solution input line 80 is selectively fluidly connected to the solution concentrate reservoirs 92 for providing the desired composition of the solution. Thus, solution profiles can be provided by the controller 60.

Thus, the continuous flow with regulated temperature, flow rate and duration can be used in conjunction with or in place of at least some of the cycling and agitating set forth above.

The processing station 40, such as the freezer chamber, in FIG. 7 is prepared by isolating the food product in the hopper 32 by closing the flow control valve 54 (or maintaining the flow valve open and allowing all the food product to pass from the hopper 32). Again, while the disclosure is understood to apply to any processing station 40, the present description is set forth in terms of the processing station being the freezer chamber. The primary drain valve 74 is opened so allow the processing station, and any portion of the upstream food flow path, to be drained. Again, the circulating loop 130 can be selectively employed under direction of the controller 60 to modify the temperature of the food product in portions of the food flow path 20 so to enhance draining.

The flow control valve 54 provides for the isolation of the hopper 32 from the freezer chamber(s), thereby allowing the freezer chamber to be emptied without exposing any fresh product mix within the hopper(s), or holding reservoir(s), from the internal treating, such as cleaning, disinfecting, rinsing, sterilizing and sanitizing process solution treatment within the portions of the food flow path 20. The in-line flow control valve 54 between the hopper 32 and the processing station 40 sufficiently isolates the food product in the hopper, such that the food product can be drained from the freezer chamber.

Once the freezer chamber is drained, the flow control valve can be opened providing fluid communication with solution input line 80 to allow solution to flow into the freezer chamber, while the door 12 remains in the closed position. The freezer chamber is thus exposed to a continuous flow of solution. In addition, either simultaneously or sequentially, the flow control valve 83 can be opened permitted solution pressure in the solution supply line 80 to partially unseat the gasket 16 and enter the freezer chamber, without having to remove the door 12. Depending on the pressure in the solution supply line and the configuration of the passage by the gasket 16, the solution may also continuously flow into the freezer chamber. As the solution continuously flows through the freezer chamber, as the door 12 is in its operable position, the beater assembly 42 can be operated by the controller 60 to provide further kinetic treatment of the freezer chamber with the continuous solution flow. The continuous solution flows from the solution input line through the drain valve 74 occurs for a predetermined period of time.

Again, the solution input line 80 can be thermally coupled to the heater 132, thus the controller 60 by virtue of the temperature sensors and flow sensors can impart a given temperature to the solution prior to introduction to the food flow path 20.

Figure 9:
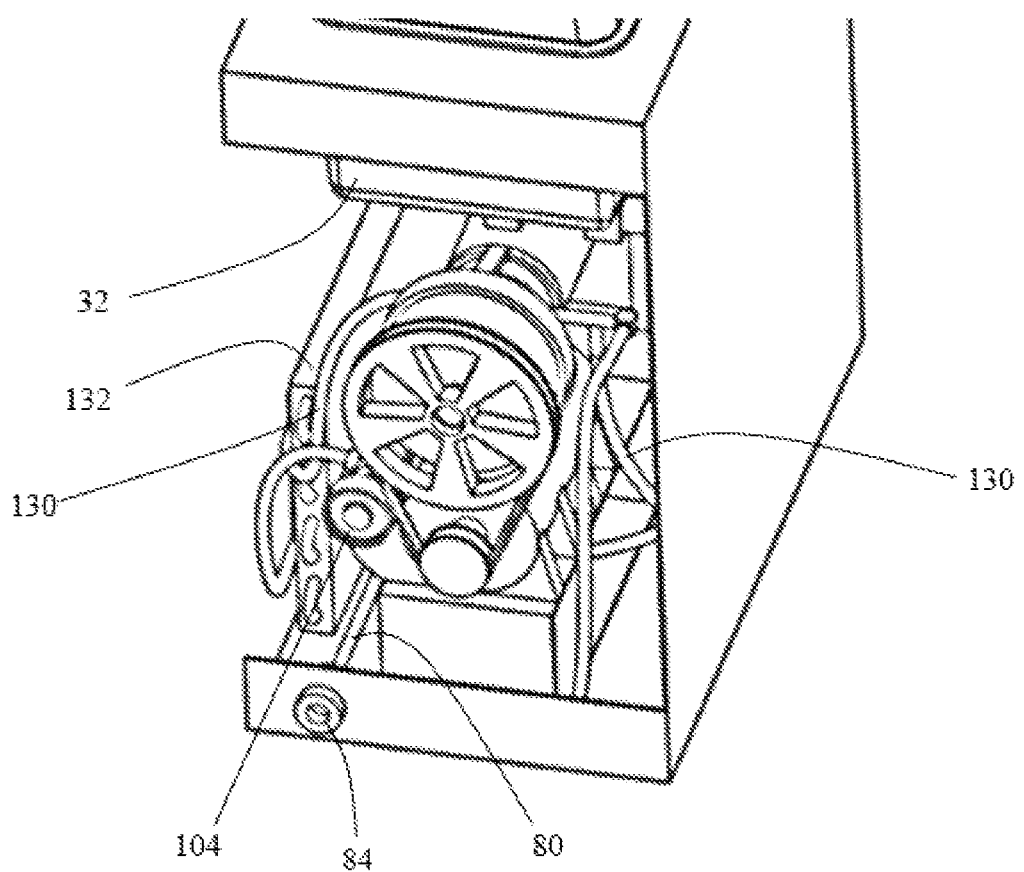
FIG. 9 is a perspective view of a configuration of the food processor showing a circulating pump.

As seen in FIGS. 7 and 9, the pump 104, functioning as the auxiliary pump can be used to increase the pressure of the solution in the solution input line 80 and/or to circulate the solution to preclude freezing of the solution within the nozzle head 110 or the lines carrying the solution.

Figure 8:
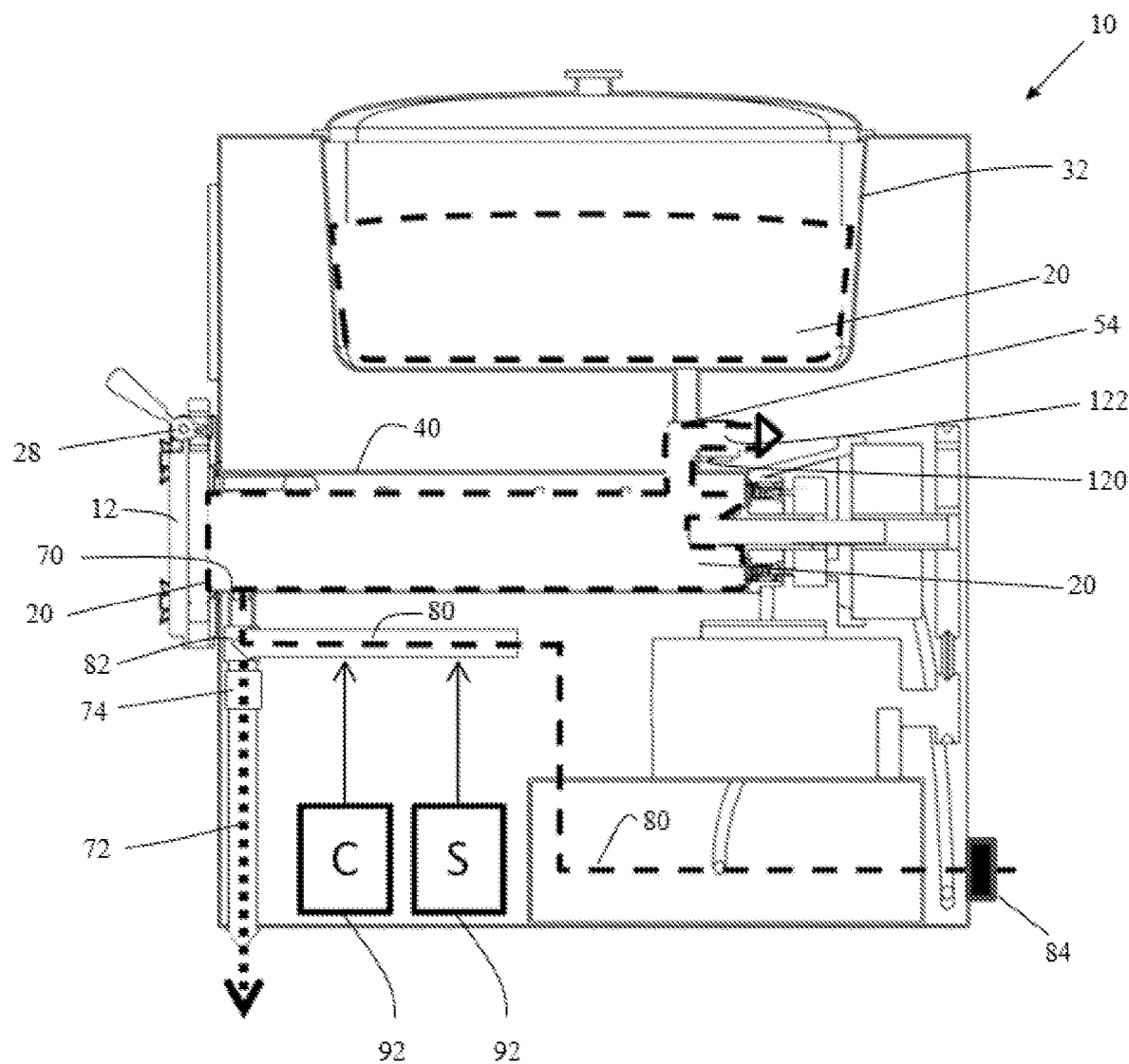
FIG. 8 is a cross sectional view of an alternative configuration of the food processor showing another solution flow path.

Referring to FIG. 8, again, while the disclosure is understood to apply to any processing station 40, the present description is set forth in terms of the processing station being the freezer chamber. The processing station 40, such as the freezer chamber, in FIG. 8 is prepared by isolating the food product in the hopper 32 by closing the flow control valve 54 (or maintaining the flow control valve open and allowing all the food product to pass from the hopper). The primary drain valve 74 is opened to allow the processing station, and any portion of the upstream food flow path, to be drained. The circulating loop 130 can be used to alter the temperature of the food product in portions of the food flow path 20 or assist in the evacuation of the food flow path, or at least sections of the food flow path.

The primary drain valve 74 is then closed and the solution input valve 82 is opened to allow solution to continuously pass from the solution input line 80 through the primary drain port 70 and into the freezer chamber 40. The created continuous flow is imparted through at least a portion of the food flow path 20, the processing station 40 being the freezer chamber. The temperature, flow rate and duration of the continuous solution flow are controlled by the controller 60. In one configuration, a continuous flow of at least 1.5 gpm introduced at to the food flow path with a temperature of at least 100° F. for at least 1 minute. In further configurations, a continuous flow of 2.5 gpm (+/−0.5) at a temperature of 112° F. (+/−5° F.) for 2 minutes to 4 minutes is established.

The temperature, flow rate and duration of the continuous solution flow are set to provide at least one of (i) imparting an at least 6 log reduction in inoculum count; (ii) extending the time for necessary removal of a freezer door defining a portion of a food flow path in the food processor to impart manual cleaning to at least 7 days and (iii) extending the time for required manual cleaning of the portion of the food flow path to at least 7 days. It is further contemplated the temperature, flow rate and duration of the continuous solution flow extends the necessary time for manual cleaning to at least 14 days and in certain configurations to 28 days. Similarly, the temperature, flow rate and duration of the continuous solution flow can extend the time for necessary removal of the freezer door to at least 14 days and in certain configurations to 28 days.

Counterintuitively, the use of a continuous flow with the present parameters can reduce the total amount of solution (water) that is used to treat the food processor. Specifically, in prior systems, buckets or pails of water are used to soak components of the food flow path at a daily interval. This water consumption in combination with the prior gravity induced rinsing and flushing uses twice the water over a given period as the present continuous flow having the requisite temperature, flow rate and duration.

The beater assembly 42 can be at rest or activated to impart kinetic action of the solution on the freezer chamber. In one configuration, the solution flow enters the freezer chamber from the primary drain port 70 and passes in a reverse direction to exit the food flow path at the flow control valve 54 to pass to the secondary drain line. It is understood, the continuous flow of solution in the food flow path can be in either the forward or the reverse direction, such as entering at valve 122 or primary drain port 70.

After a predetermined period of time of continuous flow of the solution or at a predetermined time, the solution can be modified to providing cleaning, disinfecting, sterilizing, and/or sanitizing or rinsing as necessary. After a predetermined period of time, the solution input valve 82 is closed, which stops the flow of solution through the freezer chamber. The predetermined times can be selected to allow a desired residence time of the solution with the food flow path 20. For example, a continuous flow of the solution of 30 seconds to 300 seconds can be provided to establish the necessary residence time. It is understood this cycle incorporating the intervals of continuous flow can repeated as necessary. The process can also be repeated with a rinse solution that is food compatible.

After a predetermined period of time, fluid communication with the solution input line 80 is closed and the primary drain valve 74 is then closed and the flow control valves 54 and 122 are opened allowing food product from the hopper 32 to be automatically reintroduced into the freezer chamber 40.

Referring to FIG. 17, this configuration of the food processor also provides for selective treatment of the food flow path 20 with the solution. While the description is understood to apply to any processing station 40, the present description is set forth in terms of the processing station being the freezer chamber. The flow control valve 54 can be used to isolate food product in the hopper 32 from the freezer chamber, while exposing the freezer chamber to atmosphere to break vacuum (such as through the one-way check valve). While the process is set forth as isolating the hopper 32 from the freezer chamber, it is understood isolation of the hopper is not necessary to treat the food flow path 20. However, for the present treatment of the food flow path including the hopper, the hopper is drained. The primary drain valve 74 is opened, allowing the freezer chamber to drain through the primary drain port 70 and to the primary drain line 72. The circulating loop 130 can be used to alter the temperature of the food product in portions of the food flow path 20 or assist in the evacuation of the food flow path, or at least sections of the food flow path.

The hopper can then be pre-rinsed. The primary drain valve 74 remains open and the solution input valve 82 is opened allowing the solution to flow from the solution input line 80, through a portion of the primary drain line 72, to the food flow path 20. The flow control valves exposing the solution input line 80 to the food flow path 20 are opened by the controller 60 for a predetermined period of time to allow solution to continuously flow through the freezer chamber and the hopper 32. As with each configuration, it is understood the solution can be water, or combination of cleaning, disinfecting, sterilizing, rinsing and/or sanitizing components. After the predetermined flow rate for the predetermined flow duration at the predetermined solution temperature, the flow control valves providing flow from the solution input line 80 to the food flow path are then closed. These cycles of treating such as rinsing, cleaning, disinfecting, sterilizing or sanitizing can repeat as many times as deemed necessary through the controller 60.

The flow duration is at least partly dependent upon the composition of the solution, the flow rate and the temperature of the solution flow. In one configuration, the flow duration is between 30 seconds and 300 seconds. In those configurations providing reduced water consumption compared to traditional or OEM cleaning and sanitizing instructions, the flow duration is less than three minutes with a flow rate of 2.5 gpm (+/−0.5 gpm). In other configurations, the flow duration and solution flow rate are selected to reduce reduced water consumption compared to traditional or OEM cleaning and sanitizing instructions. A flow duration that has been found satisfactory is 150 seconds (+/−15 seconds). Thus, the flow duration has a minimum duration to impart the necessary residence time for the solution and is at least partly limited by a requirement to reduce overall water consumption in the cleaning (sanitizing) process.

As in the previous operations, the inlet temperature of the solution can be controlled by the controller 60 and the heater 132 so that the solution can be any temperature required to perform the intended function, wherein a satisfactory temperature has been found to be 112° F. (+/−5° F.). It is understood that depending on the specific chemistry of the solution, such as for cleaning, disinfecting, rinsing, sterilizing or sanitizing, the solution can be raised to an appropriate temperature.

Figure 18:
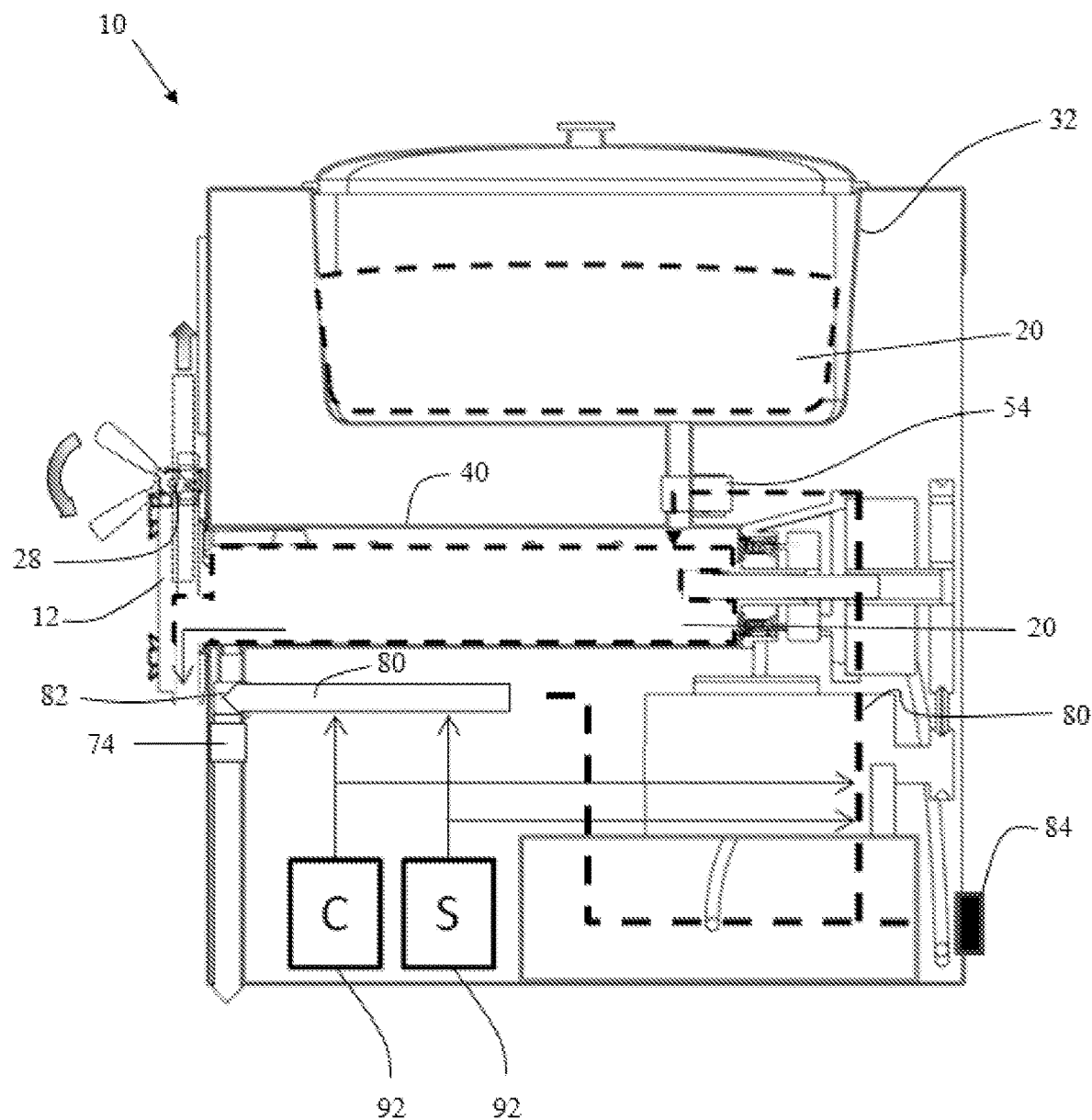
FIG. 18 is a cross sectional view of a configuration of the food processor showing a solution flow path.

In operation, referring to FIG. 18, the processing station 40, such as the freezer chamber, in FIG. 18 is prepared by isolating the food product in the hopper 32 by closing the flow valve 54 (or maintaining the flow valve open and allowing all the food product to pass from the hopper). Again, while the disclosure is understood to apply to any processing station 40, the present description is set forth in terms of the processing station being the freezer chamber. With the door remaining in the closed, operable position, the dispensing valve 28 is opened so allow the processing station, and any portion of the upstream food flow path, to be drained with or without aid of the circulating loop 130.

Dispensing valve 28 is then left open with the door 12 in the closed position. The flow control valve 54 (fluidly exposed to the solution input line 80) is then opened for a predetermined period of time to allow solution to continuously flow into the freezer chamber and through the dispensing valve at the predetermined flow rate, such as at least 1.5 gpm. The flow is thereby a continuous flow through the food flow path 20, simultaneously entering and exiting spaced locations of the food flow path for the predetermined flow duration, such as at least one minute. Optionally, the flow control valve 54 is then configured to preclude solution flow into the food flow path 20. The dispensing valve 28 is then closed and a volume of solution is retained within the food flow path 20. Solution can then be agitated within the freezer chamber for a predetermined period of time, by the controller 60 actuating the beater assembly 42. After a predetermined residence time, the dispensing valve 28 is then opened to allow solution to drain through the dispensing interface and the dispensing valve. Again, it is understood the controller 60 can repeat the of continuous flow as many times as deemed necessary to obtain at least one of (i) imparting an at least 6 log reduction in inoculum count; (ii) extending the time for necessary removal of a freezer door defining a portion of a food flow path in the food processor to impart manual cleaning to at least 7 days and (iii) extending the time for required manual cleaning of the portion of the food flow path to at least 7 days. It is further contemplated the temperature, flow rate and duration of the continuous solution flow can extend the necessary time for manual cleaning to at least 14 days and in certain configurations to 28 days. Similarly, the temperature, flow rate and duration of the continuous solution flow can extend the time for necessary removal of the freezer door to at least 14 days and in certain configurations to 28 days.

Further, as in the previous operations, the inlet temperature of the solution can be controlled by the controller 60 and the heater 132 so that the solution can be at least 100° F. and in certain configurations 112° F. (+/−5° F.). It is understood that depending on the specific chemistry of the solution, such as for cleaning, disinfecting, cleaning, sterilizing or sanitizing, the solution can be raised to the appropriate temperature.

Figure 19:
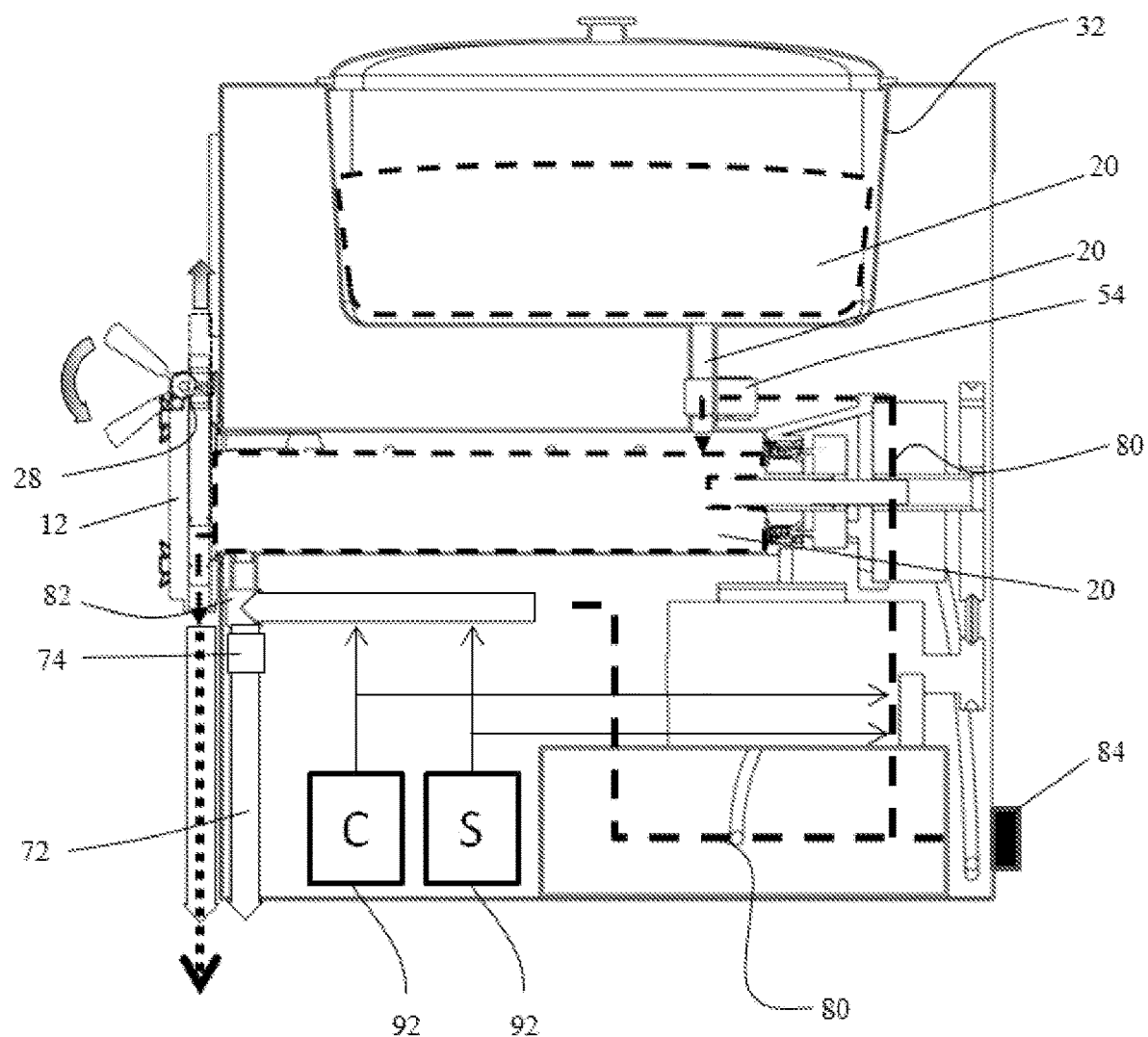
FIG. 19 is a cross sectional view of a configuration of the food processor showing a solution flow path.

In operation referring to FIG. 19, the processing station 40, such as the freezer chamber, in FIG. 19 is prepared by isolating the food product in the hopper 32 by closing the flow valve 54 (or maintaining the flow valve open and allowing all the food product to pass from the hopper). Again, while the disclosure is understood to apply to any processing station 40, the present description is set forth in terms of the processing station being the freezer chamber. The dispensing valve 28 is opened so allow the processing station, and any portion of the upstream food flow path, to be drained.

The flow control valve 54 provides for the isolation of the hopper 32 from the freezer chamber(s), thereby allowing the freezer chamber to be emptied without exposing any fresh product mix within the hopper(s), or holding reservoir(s), from the internal treating such as cleaning, rinsing, disinfecting, sterilizing and sanitizing process within the portions of the food flow path 20. The flow control valve 54 between the hopper 32 and the processing station 40 sufficiently isolates the food product in the hopper, such that the freezer chamber can be drain the freezer chamber from thawed product mix.

With the door 12 in the closed position, the dispensing valve 28 is then left opened. The flow control valve 54 (fluidly exposed to the solution input line 80) is then opened for a predetermined period of time to allow solution to continuously flow into the freezer chamber and through the dispensing valve 28. The flow is the continuous flow for imparting treating of the food flow path 20 and particularly 2.5 gpm (+/−0.5 gpm) at a temperature between 100° F. and 135° F. (+/−10° F.) for 30 seconds to 300 seconds.

It is contemplated that after the continuous flow, the flow control valve 54 can then configured to preclude solution flow into the food flow path 20. The dispensing valve 28 is then closed and a volume of solution is retained within the food flow path 20. Solution can then be agitated within the freezer chamber for a predetermined period of time, by the controller 60 actuating the beater assembly 42. After a predetermined residence time, the dispensing valve 28 is then opened to allow solution to drain through the dispensing interface and the dispensing valve. Again, it is understood the controller 60 can again impart the continuous flow of solution through the freezer chamber to obtain at least one of (i) imparting an at least 6 log reduction in inoculum count; (ii) extending the time for necessary removal of a freezer door defining a portion of a food flow path in the food processor to impart manual cleaning to at least 7 days and (iii) extending the time for required manual cleaning of the portion of the food flow path to at least 7 days. It is further contemplated the temperature, flow rate and duration of the continuous solution flow can extend the necessary time for manual cleaning to at least 14 days and in certain configurations to 28 days. Similarly, the temperature, flow rate and duration of the continuous solution flow can extend the time for necessary removal of the freezer door to at least 14 days and in certain configurations to 28 days.

Again, as in the previous operations, the inlet temperature of the solution can be controlled by the controller 60 and the heater 132 so that the solution can be any temperature required to perform the intended function. It is understood that depending on the specific chemistry of the solution, such as for cleaning, rinsing, disinfecting, sterilizing or sanitizing, the solution can be raised to the appropriate temperature.

As the flow control valves and operation of the food processor 10 are under the direction of the controller 60, the food processor can automatically perform the desired treatment of the food flow path 20 during off-hours, including automated removal of food product from the relevant sections of the food flow path 20, draining the portions of the food flow path, introducing the continuous solution flow at the predetermined flow rate and temperature to the food flow path for the necessary flow duration through treated portion of the food flow path. During the treatment process, the food product in the portion of the food flow path 20 is replaced with the continuous flow of solution, which can be but is not limited to sterilizing, rinsing, sanitizing or cleaning solutions, so as to treat the sections of the food flow path. The introduction and control of the continuous solution flow can increase the effective treatment of the portions of the food flow path 20, while eliminating the need to keep the food product chilled within the freezer chamber. The quality of the dispensed food product is thus increased as the food product is not being agitated within the freezer chamber over extended non-dispensing periods.

Therefore, the present food processor 10 provides for the continuous flow of solution to portions of the food flow path 20, without removal of the door 12, wherein internal components in the food flow path can be in motion, or static, and flow of the solution is able to physically make contact with the surface of the food flow path, reducing residual food product from those surfaces, and particularly to impart at least one of (i) imparting an at least 6 log reduction in inoculum count; (ii) extending the time for necessary removal of a freezer door defining a portion of a food flow path in the food processor to impart manual cleaning to at least 7 days and (iii) extending the time for required manual cleaning of the portion of the food flow path to at least 7 days. It is further contemplated the temperature, flow rate and duration of the continuous solution flow can extend the necessary time for manual cleaning to at least 14 days and in certain configurations to 28 days. Similarly, the temperature, flow rate and duration of the continuous solution flow can extend the time for necessary removal of the freezer door to at least 14 days and in certain configurations to 28 days.

The solution can include commercially available product, such as ProNatural Antimicrobial MultiSurface Cleaner, LEXX Liquid Sanitizer and Cleaner Concentrate and ProNatural All Purpose Cleaner/Degreaser. The ProNatural Antimicrobial MultiSurface Cleaner has ingredients, as defined by the EPA, as posing little or no risk to human health or the environment (an minimum risk pesticide, MRP) along with the ability to kill odor causing bacteria. Both ProNatural Antimicrobial MultiSurface Cleaner and ProNatural All Purpose Cleaner/Degreaser are based on ingredients that are naturally derived, non-corrosive, and actually qualify as FDA approved direct, no rinse (NSF category D2, antimicrobial agents not requiring rinse) food additives.

The ProNatural Antimicrobial MultiSurface Cleaner is based on a natural acid and a naturally derived anionic surfactant. These ingredients meet the US EPA Minimum Risk Pesticide requirements. The EPA has determined that these ingredients pose little to no risk to human health or the environment and therefore are exempt from the formal EPA registration that is required of other cleaning products designated with an EPA label.

ProNatural Antimicrobial Efficacy Studies

| Pathogen | Contact Time | Log Reduction |
|---|---|---|
| Bacteria (gm+) | | |
| *Staphylococcus aureus* (gm+) | 30 sec | >7.00 |

-continued

| Pathogen | Contact Time | Log Reduction |
| --- | --- | --- |
| *Listeria monocytogenes* (gm+) | 30 sec | >6.26 |
| *Enterococcus faecalis* (VRE) (gm+) | 5 min | >7.41 |
| MRSA (gm+) | 5 min | >6.13 |
| *Clostridium difficile* (gm+) | 15 min | 0.72 |
| Bacteria (gm−) | | |
| *Eschericia coli* (gm−) | 30 sec | >7.00 |
| *Pseudomonas aeruginosa* (gm−) | 60 sec | >7.00 |
| *Legionella pneumophilia* (gm−) | 60 sec | >6.00 |
| *Acinetobacter baumannii* (gm−) | 60 sec | >6.00 |
| *Stenotrophomonas maltophilia* (gm−) | 60 sec | >6.00 |
| *Enterobacter cloacae* (CRE) (gm−) | 5 min | >7.43 |
| *Enterobacter aerogenes* (gm−) | 5 min | >5.34 |
| Salmonella enterica(gm−) | 5 min | >5.63 |
| *Neisseria gonorrhoeae* (gm−) | 5 min | >3.66 |
| Yeast/Mold | | |
| Candida albicans | 15 min | >6.00 |
| Dekkera bruxellensis | 5 min | >5.40 |
| Viruses | | |
| Norovirus | 10 min | >4.25 |

The food processor 10 can employ the reservoir 32 for retaining a food product; the freezer chamber 40 fluidly connected to the reservoir and having the inlet port 44 for passing food product into the freezer chamber, the outlet port 46 for passing food product from the freezer chamber; the solution component source 92; and the solution input line 80 connected to the solution component source for passing the solution having the solution component into and through the freezer chamber. In this configuration, the controller 60 selectively imparts a continuous flow of a solution into at least a portion of the food flow path 20, or the continuous flow sufficient to treat the portion of the food flow path to provide the reductions set forth above.

Thus, the present disclosure provides a method and system for extending the time period between required manual cleaning (as set forth by the manufacturer or in order to meet the Food Code)) of at least portions of the food flow path 20 in the food processor 10.

In one configuration, the food processor 10 can include a freezer chamber as the processing station 40. The food processor 10 includes the hopper as a product reservoir and the freezer chamber. Typically, a dispensing interface is located downstream of the freezer chamber for selectively passing food product from the food processor 10. As set forth above, the food processor 10 can include the freezer door 12, wherein the freezer door retains at least a portion of the dispensing interface, such as the dispensing valves. Thus, the freezer door 12 can define a portion of the food flow path. In further configurations, the freezer door 12 can support or retain a portion of a beater or agitator assembly of the freezer chamber.

As used herein, the term "manufacturer recommended sanitization procedure" means those actions, instructions and materials as provided by the manufacturer of the food processor 10, such as a dispensing freezer for ensuring sanitization of the food processor (sometime referred to as a dispensing freezer).

As used herein, the term "mechanical sanitization" means the process of sanitizing food product contact surfaces by circulating or passing sanitizing solutions throughout a system that has previously been disassembled and manually cleaned and sanitized.

As used herein, the term "manual cleaning" means cleaning of the disassembled components as well as at least certain in place components or surfaces by hand with appropriate cleaning tools. The manual cleaning includes a removal of the door 12 or at least moving the door from the closed position to the open position. In select configurations, the mechanical sanitization, and hence manual cleaning, includes removal of the freezer door of the food processor.

The necessary the necessary time for manual cleaning of the portion of a food flow path 20 is understood to be at least one of the manufacturer recommended time or frequency for manual cleaning to meet applicable food safety regulations, including federal and state regulations. These regulations include the Food Code, 2017 Recommendations of the United States Public Health Service Food and Drug Administration, US Public Health Service, FDA, US Food & Drug Administration, U.S. Department of Health And Human Services 2017 (and 2013). The necessary time for manual cleaning to meet the Food Code is extended to 7 days, and in certain configurations 14 days and 28 days, without requiring removal of the door 12. Alternatively, or additionally, the necessary time for manual cleaning may be the time required to meet or exceed standards such as the National Sanitation Foundation, known as NSF International. NSF or NSF/ANSI standards for dispensing freezers, such as the presently disclosed food processor 10 having the freezer chamber 40 can be met by the present disclosure. That is, the present system provides for a reduced necessity of manual cleaning (requiring the at least partial disassembly of the food processor 10) in order to meet food safety standards, such as the Food Code 2017 (or 2013)—herein incorporated by reference. By employing the present continuous flow of solution disassembly of the food processor 10, or at least removal of the door 12, and manual cleaning does not need to be conducted daily as is currently done, but can be done every 7 days.

By exposing the food flow path 20 to the continuous predetermined flow rate and temperature of the solution for the predetermined flow duration, the present system provides for at least a 6 log reduction in inoculum density, as set forth below, (hereinafter "6 log reduction") without requiring removal of the freezer door 12 of the food processor 10 (dispensing freezer). That is, the freezer door 12 remains operably in place while the continuous flow provides a sufficient organism reduction so as to provide an at least a 6 log reduction.

Thus, a method of treating, such as cleaning is provided, wherein the freezer door of the food processor 10 remains in operable engagement and manual cleaning is required once, including only once, in seven days and in select configurations once, including only once, in 14 days and in certain configurations once, including only once, in 28 days or more, wherein an at least a 6 log reduction is imparted by the treating with the continuous flow.

The time period between manual cleanings of the food processor 10, such as a dispensing freezer, and particularly the freezer chamber 40 is extended by removing at least a percentage of the food product, such as by draining, from at least a portion of the food flow path 20, optionally agitating a volume of solution within the freezer chamber, and exposing the portion of the food flow path to a continuous solution flow of a flow rate, temperature and duration sufficient to impart an at least 6 log reduction within the portion of the food flow path. In select configurations, an at least 6 log reduction is provided by the process, so as to sufficiently determine or extend the time for required manual cleaning to at least 7 days, and in some configurations to at least 14 days and in further configurations to at least 28 days.

In a further configuration, the time period between manual cleaning of the food processor 10, such as a dispensing freezer, is determined or extended by agitating at least one fluid against at least a portion of the food flow path and/or exposing the portion of the food flow path to a continuous solution flow of a flow rate, temperature and flow duration to impart an at least 6 log reduction within the portion of the food flow path, wherein prior to the agitating step, a percentage of the food product can be removed from the food flow path, such that the percentage can be between 0% and 100%. In select configurations, an at least 6 log reduction is provided by the process, so as to sufficiently determine or extend the time for required manual cleaning to at least 7 days, and in some configurations to at least 14 days and in further configurations to at least 28 days.

Thus, the time period between necessary removal of the freezer door 12 of the food processor 10, such as a dispensing freezer, is determined or extended by removing at least a percentage of the food product, such as by draining the food product from at least a portion of the food flow path; and continuously flowing at least one solution of a predetermined flow rate, temperature and flow duration against at least a portion of the food flow path to impart an at least 6 log reduction in the at least portion of the food flow path. In select configurations, an at least 6 log reduction is provided by the process, to sufficiently extend the time for required necessary removal of the freezer door to at least 7 days, and in some configurations to at least 14 days and in further configurations to at least 28 days.

In a further configuration, the time period between necessary removal of the freezer door 12 of the food processor 10, such as a dispensing freezer, to provide regulated sanitation, is determined or extended by continuously flowing at least one solution at predetermined flow rate, temperature and flow duration against at least a portion of the food flow path 20 to impart an at least 6 log reduction in the at least portion of the food flow path, wherein prior to the agitating step, a percentage of the food product can be removed from the food flow path, such that the percentage can be between 0% and 100%. In select configurations, an at least 6 log reduction is provided by the process, to sufficiently extend the time for required necessary removal of the freezer door to at least 7 days, and in some configurations to at least 14 days and in further configurations to at least 28 days.

Similarly, the time period between manual cleaning of the dispensing freezer is determined or extended by removing at least a percentage of the food product, such as by draining the food product from at least a portion of the food flow path 20; agitating or flowing or agitating and flowing at least one continuous solution against at least a portion of the food flow path and/or exposing the portion of the food flow path to a solution flow sufficient to determine or extend the time for required manual cleanings of the dispensing freezer to at least 7 days. In select configurations, an at least 6 log reduction is provided by the process, to sufficiently determine or extend the time for required manual cleaning to at least 7 days, and in some configurations to at least 14 days and in further configurations to at least 28 days.

Similarly, in a further configuration, the time period between manual cleaning of the food processor 10, such as a dispensing freezer, is determined or extended by agitating or continuously flowing or agitating and continuously flowing at least one solution against at least a portion of the food flow path and/or exposing the portion of the food flow path to a sufficient continuous solution flow of a predetermined flow rate, temperature and flow duration to determine or extend the time for required manual cleaning of the dispensing freezer to at least 7 days, wherein prior to the agitating step, a percentage of the food product can be removed from the food flow path, such that the percentage can be between 0% and 100%. In select configurations, an at least 6 log reduction is provided by the process, to sufficiently determine or extend the time for required manual cleaning to at least 7 days, and in some configurations to at least 14 days and in further configurations to at least 28 days.

Correspondingly, the time period for necessary removal of the freezer door 12 of the food processor 10, such as a dispensing freezer, is determined or extended by removing at least a percentage of the food product, such as by draining, at least a portion of the food product from at least a portion of the food flow path 20; agitating or continuously flowing or agitating and continuously flowing at least one solution against the portion of the food flow path and/or exposing the portions of the food flow path to a continuous solution flow of a predetermined flow rate, temperature and flow duration sufficient to determine or extend the necessary frequency of removal of the freezer door for purposes of manual cleaning to at least 7 days. In select configurations, an at least 6 log reduction is provided by the process, to sufficiently determine or extend the time for removal of the freezer door to at least 7 days, and in some configurations to at least 14 days and in further configurations to at least 28 days.

Correspondingly, in a further configurations, the time period for necessary removal of the freezer door of the food processor 10, such as a dispensing freezer, is determined or extended by agitating or continuously flowing or agitating and continuously flowing at least one solution against the portion of the food flow path and/or exposing the portions of the food flow path having the door 12 in the closed position to a continuous solution flow of a predetermined flow rate, temperature and flow duration sufficient to determine or extend the necessary frequency of removal of the freezer door for purposes of manual cleaning to at least 7 days, wherein prior to the agitating step, a percentage of the food product can be removed from the food flow path, such that the percentage can be between 0% and 100%. In select configurations, an at least 6 log reduction is provided by the process, to sufficiently determine or extend the time for removal of the freezer door to at least 7 days, and in some configurations to at least 14 days and in further configurations to at least 28 days.

By optionally removing a percentage of the food product, such as by draining, from a portion of the food flow path 20; agitating or continuously flowing or agitating and continuously flowing the solution within the portion of the food flow path and/or continuously flowing the solution through the portion of the food flow path at predetermined flow rate, temperature and flow duration, wherein the freezer door 12 remains operably engaged with the food processor, the time period between required manual cleaning of the food flow path is determined or extended to at least 7 days by the process providing an at least 6 log reduction in the portion of the food flow path. That is, a sufficient inoculum reduction is provided to treated portion of the food flow path 20, without removing the freezer door of the food processor 10, such as a dispensing freezer so as to determine or extend the period for necessary manual cleaning to at least 7 days in one configuration, to at least 14 days in a further configuration, and at least 28 days in another configuration. Thus, a method is provided for determining or extending the frequency for a required removal of the dispensing freezer door 12 necessary to maintain the dispensing freezer in an operable condition.

Alternatively stated, the present system provides sufficient cleaning (sanitizing) without manually accessing internal components of the food processor 10, such as a dispensing freezer, by imparting an at least 6 log reduction to the treated portion of the food flow path with the door 12 remaining in the closed position. Thus, those components which cannot be accessed unless a portion of the food processor 10, such as a dispensing freezer, are temporarily removed, can be sufficiently treated in place to impart an at least 6 log reduction and thereby extend or set the necessary frequency of manual cleaning of those components to at least 7 days, or to at least 14 days in a further configuration, and at least 28 days in another configuration.

The present disclosure provides a method of cleaning the food processor 10, such as a dispensing freezer, having the food flow path 20 having the product reservoir (hopper) and the freezer chamber, the method comprising (a) removing at least a percentage of the food product, such as by draining at least a portion of the food product from at least a portion of the food flow path; (b) simultaneously introducing to and passing the solution from the drained portion of the food flow path with the door 12 remaining in the closed position to create a continuous solution flow at a predetermined minimum flow rate, temperature and flow duration to impart an at least 6 log reduction sufficient to increase the operating time of the food processor between manual disassembly required for manual cleaning to at least 7 days or to at least 14 days in a further configuration, and at least 28 days in another configuration.

The present disclosure further provides a method of cleaning the food processor 10, such as a dispensing freezer, having the food flow path 20 having the product reservoir (hopper) and the freezer chamber 40, the method comprising simultaneously introducing to and passing the solution from a portion of the food flow path with the door 12 remaining in the closed position, to create a continuous flow of a predetermined minimum flow rate, temperature and flow duration to impart an at least 6 log reduction sufficient to increase the operating time of the dispensing freezer between manual disassembly required for manual cleaning to at least 7 days or to at least 14 days in a further configuration, and at least 28 days in another configuration, wherein prior to the simultaneously introducing to and passing step, a percentage of the food product can be removed from the food flow path, such that the percentage can be between 0% and 100%. The method can further include removing a percentage of the food product, such as by draining at least a portion of the food product from the portion of the food flow path, prior to passing the continuous flow through the portion of the food flow path 20.

Thus, the present structure and method extend the period of time for manual cleaning of the food processor 10, such as a dispensing freezer, to at least 7 days, and in select configurations, and in certain configurations to at least 14 days, and in other configurations to at least 28 days by passing a continuous flow of solution at a minimum predetermined flow, rate, temperature and flow duration through the part of the food flow path to impart an at least 6 log reduction to the treated portion of the food flow path. That is, the time between necessary manual cleaning of internal components of the food processor 10 including the at least portions of the food flow path without requiring disassembly of that portion of the food flow path is extended beyond what is otherwise necessary.

In one configuration, the method includes mechanically separating or isolating a portion of the food flow path or a component in the food flow path 20; removing at least a portion of the food product from at least a portion of the separated or isolated food flow path or component; treating, with the door 12 in the closed position, the at least a portion of the separated or isolated food flow path or component with a continuous solution flow of a predetermined minimum flow rate, temperature and flow duration to at least one of (i) extend the necessary frequency of removing the freezer door of the dispensing freezer for manual cleaning to at least 7 days and (ii) provide at least a 6 log reduction to the treated portions of the food flow path.

The log reduction is calculated, in accordance with the procedure set forth below, by for each sample, the total counts on the initial inoculum density ($N_i$) of at least 1,000,000 ($1 \times 10^6$) and the total counts on the colony forming units (CFUs) recovered ($N_f$) shall demonstrate a reduction equal to or greater than 99.9999% (6 log). The log reduction is calculated from the equation:

$$R = \log_{10} \frac{N_i}{N_f}$$

where $N_i$ = initial inoculum density $(CFU/\text{ml})$ $N_f$=the number of CFU recovered in each sample (CFU/ml), such that if $N_f < 0$, the samples shall be considered acceptable.

Log Reduction Calculation
Methods for preparing and analyzing in-place cleaning bacteria surrogate
A.1 Summary
  *E. coli* is used as the challenge organism for the in-place cleaning test. Presented in this section are the methods used for suspension preparation, controls, and analysis of the challenge organism.
A.2 Equipment
  autoclave, 121±1° C. (250±1° F.); and
  incubator, 36±1° C. (97±1° F.); and
  refrigerator, 5±1° C. (41±3° F.); and
  water bath 50±1° C. (122±1° F.); and
  freezer; and
  vortex mixer; and
  pH meter; and
  colony counter; and
  filtration units, autoclavable glass or plastic filtration units; and
  sterile filtration apparatus; and
  analytical balance; and
  Bunsen burner; and
  blunt tipped forceps; and
  hot plate; and
  pipettor.
A.3 Microorganism
  *Escherichia coli* (American Type Culture Collection #11229) shall be obtained from American Type Culture Collection, P. O. Box 1549, Manassas, VA 20108.
A.4 Supplies
  petri dishes, 50×9 mm, sterile; and
  pipette tips, 1000 µL and 100 µL, sterile; and disposable sterile 250-mL polypropylene container; and
test tubes, 16×125 mm; and
sterile inoculating loop; and
sterile 0.45 μm mixed cellulose esters membrane filters; and
French squares bottles (250 mL); and
autoclavable containers capable of holding up to 10 L.

A.5 Reagents

Sterile buffered dilution water (SBDW) shall be prepared according to the Standard Methods for the Examination of Water and Waste water (dilution water: buffered water); and Sodium Thiosulfate Solution 10% (NaS2O3) shall be prepared by adding 100 g reagent grade sodium thiosulfate per 900 mL DI water, and autoclaved for 30 min at 121±1° C. (250±1° F.); and Sodium Hydroxide (NaOH) Solution. 1N shall be used to adjust pH of reagents; and Hydrochloric Acid (HCl) Solution. 5 N shall be used to adjust pH of reagents; and Neutralizer stock solution shall be prepared as follows: 40 gm lecithin, 280 mL Tween 80, and 1.25 mL phosphate buffer shall be mixed together with 1 L distilled water. pH shall be adjusted to 7.2. Solution shall be dispensed into 100-mL portions and autoclaved 15 min at 121±1° C. (250±1° F.); and Phosphate buffer solution shall be prepared according to the Standard Methods for the Examination of Water and Waste water (dilution water: buffered water).

A.6 Safety Precautions and Hazards

A.6.1 Steam sterilized samples and equipment shall be handled with protective gloves when being removed from the autoclave.

A.6.2 Cryogenic culture vials shall be handled with cryoprotective gloves.

A.6.3 All microbiological samples and contaminated test supplies shall be steam sterilized to 121±1° C. (250±1° F.) at 15 psi for a minimum of 20 min prior to being discarded.

A.7 Growth Medium

NOTE 1—Common bacteriological media may be purchased from bacteriological medium manufacturers and prepared according to the manufacturer's instructions.

NOTE 2—The quality of the growth media shall be monitored by examining growth promotion and sterility prior to use.

A.7.1 TSB (Tryptic Soy Broth)
Ingredient Amount
tryptone 1.7 g
soytone 0.3 g
dextrose 0.25 g
sodium chloride 0.5 g
dipotassium phosphate 0.25 g
DI water 100 mL
pH 7.3±0.2

TSB shall be dissolved by boiling and adjusted to final pH. 8-mL aliquots shall be dispensed into 16×150 mm test tubes. TSB shall be autoclaved at 121±1° C. (250±1° F.) at 15 psi for 20 min. Cooled broth shall be stored at 5±1° C. (41±1° F.).

A.7.2 TSA (Tryptic Soy Agar)
Ingredient Amount
tryptone 7.5 g
soytone 2.5 g
sodium chloride 2.5 g
bacto-agar 7.5 g
DI water 500 mL
pH 7.3±0.2

TSA shall be dissolved by boiling, adjusted to final pH, and autoclaved at 121±1° C. (250±1° F.) at 15 psi for 20 min. Tempered media shall be poured into sterile petri dishes. Agar plates shall be stored at 5±1° C. (41±1° F.). Plates shall be allowed to come to room temperature before use.

A.7.3 Coliform growth media

A.7.3.1 Coliscan® MFculture medium [Micrology Laboratories, 1303 Eisenhower Dr., S. Goshen, IN 46526-5360]

Broth shall be purchased from the manufacturer. Broth shall be dispensed in 1.75 to 2 mL quantities into lower section of 50×9 mm sterile plastic petri dishes with pad. Broth shall be stored at 5±1° C. (41±1° F.).

A.7.3.2 CHROMagar® culture medium

Agar shall be prepared according to manufacturer's directions. It shall be brought to a boil and cooled to 45±1° C. (113±1° F.). Agar shall be dispensed in 4 to 5 mL quantities into lower section of 50×9 mm sterile plastic petri dishes.

A.8 Culture of *E. coli*

A.8.1 Stock culture preparation a) *E. coli* #11229 shall be obtained from ATCC.

b) Stock culture shall be rehydrated with TSB and maintained in TSB. The culture shall then be incubated at 36±1° C. (97±1° F.).

c) This working stock culture may be maintained at 3±2° C. (37.4±1° F.) for up to one month, at which time the culture shall be passed to a new TSB tube. Working stock culture shall be discarded after 12 months/passages and a new vial reconstituted from ATCC.

A.8.2 Challenge culture preparation a) 1 mL of the stock culture shall be transferred to a TSA slant prepared in a French bottle with a surface approximately 75 cm2 in area. The media shall then be incubated at 36±1° C. (97±1° F.) for 24 h.

b) Cells shall be washed from agar surface with 5 mL of SBDW. Agar surface shall be scraped with sterile disposable loops.

c) 0.5 mL of *E. coli* culture suspension shall be pipetted into 4 L of SBDW. This will give a density of 1 to 5×106 colony forming units (CFU) per mL.

A.8.3 Enumeration a) For each test sample, one 100-mL and 10-mL sample shall be aseptically processed using the membrane filter technique. A mixed cellulose ester membrane with a pore size of 0.45 μm shall be used. Test sample shall be plated on ColiScan®CHROMagar®, inverted, and incubated at 36±1° C. (97±1° F.) for 24 h.

b) After incubation, plates containing 20-200 distinct colony forming units (CFU) shall be enumerated using a Colony Counter. Results shall be expressed as the number of CFU/100 mL.

A.8.4 Negative control a) For the negative control samples, a 100-mL sample shall be aseptically processed using the membrane filter technique. A mixed cellulose ester membrane with a pore size of 0.45 μm shall be used. Test sample shall be plated on ColiScan®CHROMagar®, inverted, and incubated at 36±1° C. (97±1° F.) for 24 h.

b) After incubation, plates containing 20-200 distinct colony forming units (CFU) using a Colony Counter shall be enumerated. Results shall be expressed as the number of CFU/100 mL.

A.8.5 Positive challenge culture control a) For the positive challenge control samples, serial dilutions of the samples (100-10-4) shall be made using SBDW. 10-4 and 10-5 dilutions shall be aseptically processed using the membrane filter technique. Test sample shall be plated on ColiScan®CHROMagar®, inverted, and incubated at 36±1° C. (97±1° F.) for 24 h.

After incubation, plates containing 20-200 distinct colony forming units (CFU) shall be enumerated using a Colony Counter. Results shall be expressed as the number of CFU/100 mL.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of treating at least a portion of a food flow path in a food processor, the method comprising:
    (a) retaining a freezer door in a closed position relative to a freezer chamber in the food flow path, the freezer door moveable between an open position and the closed position;
    (b) connecting a cleaning assembly to the freezer door, the cleaning assembly connected to a source of motive fluid to urge introduction of a cleaning fluid through the freezer door and into the freezer chamber;
    the cleaning assembly includes one or more flow control valves that are fluidly connected to the source of motive fluid and operate to control introduction of the motive fluid, wherein the cleaning assembly further receives a solution container and when the one or more flow control valves are open allows motive fluid mixed with the cleaning fluid to flow through the freezer door;
    (c) removing at least a portion of a food product from the freezer chamber, the freezer chamber having an inlet port for receiving the food product from an upstream supply into the freezer chamber and an outlet port for passing the food product from the freezer chamber, the one or more flow control valves positioned to allow the motive fluid to flow into the freezer chamber and urge the food product within the freezer chamber to be removed therefrom;
    (d) operating the one or more flow control valves to introduce a volume of the cleaning fluid into the freezer chamber for a given residence time after removing the at least the portion of the food product from the freezer chamber;
    (e) removing least a portion of the volume of the cleaning fluid from the freezer chamber after the given residence time; and
    (f) after removing at least a portion of the volume of the cleaning fluid from the freezer chamber after the given residence time and with the freezer door in the closed position, operating the one or more flow control valves to introduce a sanitizing solution that includes one of an acidic and basic wash concentrate, wherein the sanitizing solution for continuously flows through the freezing chamber at a sufficient flow rate and sufficient temperature for a sufficient duration through the freezer chamber to at least one of (i) impart at least a 6 log reduction in inoculum count and (ii) extend the necessary time for manual cleaning to meet a 2017 FDA Food Code 4-602.11 (2017) specification for frequency of cleaning equipment food-contact surfaces and utensils for the portion of the food flow path exposed to the continuous flow of the sanitizing solution to at least 7 days, wherein the sanitizing solution continuously flows at a flow rate between 2 and 3 gallons per minute for between 30 seconds and 300 seconds;
    (g) closing the one or more flow control valves to prevent introduction of sanitizing solution and waiting predetermined time to allow the previously introduced sanitizing solution to remain within the freezer chamber;
    (h) opening the one or more flow control valves to again introduce the sanitizing solution into the freezer chamber with the sanitizing solution flowing through the freezing chamber then flowing such that the sanitizing solution then leaves the food processor;
    (i) disconnecting the cleaning assembly from the freezer door, and allowing food product to enter the freezing chamber; and
    (j) operating the freezer chamber with the freezer door retained in a closed position relative to the freezer chamber in the food flow path;
    (k) at least 7 days after the preceding method steps (a) through (i) are completed, either moving the freezer door to an open position or removing the freezer door, and performing a manual cleaning of the food flow path of the food processor.

2. The method of claim 1, further comprising isolating at least a portion of the upstream supply of food product from the downstream freezer chamber.

3. The method of claim 2, further comprising operating a flow control valve within the food processor to isolate the at least a portion of the upstream supply of food product from the downstream freezer chamber.

4. The method of claim 1, further comprising extending the necessary time for manual cleaning to meet the 2017 FDA Food Code to at least 28 days.

5. The method of claim 1, wherein the sanitizing solution includes water and citric acid.

6. The method of claim 1, wherein the continuously flowing includes the sanitizing solution at a flow rate between 2 and 3 gallons per minute at a temperature between 100° F. and 125° F. for between 30 seconds and 300 seconds.

7. The method claim 1, wherein the one or more flow control valves are self-cleaning.

8. The method of claim 1, further comprising a step of operating a beater assembly within the freezer chamber during the step of operating the one or more flow control valves to introduce a sanitizing solution for continuously flowing the sanitizing solution.

9. The method of claim 1, wherein the sanitizing solution is a natural acid and a naturally derived anionic surfactant.

10. The method of claim 1, wherein the sanitizing solution is removed the food processor through a drain line.

11. The method of claim 1, wherein the sanitizing solution is removed the food processor through a hopper that is configured to receive food product to flow to the freezing cylinder during normal operations.

12. The method of claim 1, wherein the solution container of the cleaning assembly comprises first and second solution containers, a first solution container receives a container of the cleaning fluid and the second solution container receives a container of the sanitizing fluid, wherein each of the first and second containers when open allows motive fluid mixed with the respective cleaning fluid and the sanitizing fluid to flow through the freezer door.

13. The method of claim 1, wherein the motive fluid is pressurized water received from a public utility water source or an integral reservoir.

14. The method of claim 1, wherein removing at least a portion of the food product from the freezer chamber comprises allowing the motive fluid to flow to an input end where food product is introduced into the food processor during normal operations.

15. A method of treating at least a portion of a food flow path in a food processor, the method comprising:
(a) retaining a freezer door in a closed position relative to a freezer chamber in the food flow path, the freezer door moveable between an open position and the closed position;
(b) connecting a cleaning assembly to the freezer door, the cleaning assembly connected to a source of motive fluid to urge introduction of a cleaning fluid through the freezer door and into the freezer chamber;
the cleaning assembly includes one or more flow control valves that are fluidly connected to the source of motive fluid and operate to control introduction of the motive fluid, wherein the cleaning assembly further receives a solution container and when the one or more flow control valves open allows motive fluid mixed with the cleaning fluid to flow through the freezer door;
(c) draining at least a portion of a food product from the freezer chamber;
(d) operating the one or more flow control valves to introduce a volume of the a cleaning fluid into the freezer chamber, the cleaning or sanitizing solution including one of an acidic and basic wash concentrate;
(e) retaining the introduced cleaning fluid in the freezer chamber for a given residence time;
(f) draining at least a portion of the volume of the cleaning fluid from the freezer chamber after the given residence time; and
(g) after draining at least a portion of the volume of the cleaning fluid from the freezer chamber and with the freezer door in the closed position, operating the one or more flow control valves to introduce a sanitizing solution for continuously flowing the sanitizing solution that includes one of an acidic and basic wash concentrate, at a sufficient flow rate and sufficient temperature for a sufficient duration through the freezer chamber to at least one of (i) impart at least a 6 log reduction in inoculum count and (ii) extend the necessary time for manual cleaning to meet a 2017 FDA Food Code 4-602.11 (2017) specification for frequency of cleaning equipment food-contact surfaces and utensils for the portion of the food flow path exposed to the continuous flow of the sanitizing solution to at least 7 days, wherein the sanitizing solution continuously flows at a flow rate between 2 and 3 gallons per minute for between 30 seconds and 300 seconds;
(h) closing the one or more flow control valves to prevent introduction of sanitizing solution and waiting predetermined time to allow the previously introduced sanitizing flow to remain within the freezing chamber;
(i) opening the one or more flow control valves to again introduce the sanitizing solution into the freezing chamber with the sanitizing solution flowing through the freezer chamber then flowing such that the sanitizing solution then leaves the food processor;
(j) disconnecting the cleaning assembly from the freezer door, and allowing food product to enter the freezer chamber; and
(k) operating the freezer chamber with the freezer door retained in a closed position relative to the freezer chamber in the food flow path;
(l) at least 7 days after the preceding method steps (a) through (j) are completed, either moving the freezer door to an open position or removing the freezer door, and performing a manual cleaning of the food flow path of the food processor.

16. The method of claim 15, further comprising isolating at least a portion of the upstream supply of food product from the downstream freezer chamber.

17. The method of claim 16, further comprising operating a flow control valve within the food processor to isolate the at least a portion of the upstream supply of food product from the downstream freezer chamber.

18. The method of claim 15, further comprising extending the necessary time for manual cleaning to meet the 2017 FDA Food Code to at least 28 days.

19. The method of claim 15, wherein the sanitizing solution includes water and citric acid.

20. The method of claim 15, wherein the continuously flowing includes the sanitizing solution at a flow rate between 2 and 3 gallons per minute at a temperature between 100° F. and 125° F. for between 30 seconds and 300 seconds.

21. The method claim 15, wherein the one or more flow control valves are self-cleaning.

22. The method of claim 15, further comprising a step of operating a beater assembly within the freezer chamber during the step of operating the one or more flow control valves to introduce a sanitizing solution for continuously flowing the sanitizing solution.

23. The method of claim 15, wherein the sanitizing solution is a natural acid and a naturally derived anionic surfactant.

24. The method of claim 15, wherein the sanitizing solution is drained the food processor through a drain line.

25. The method of claim 15, wherein the sanitizing solution is drained from the food processor through a hopper that is configured to receive food product to flow to the freezing cylinder during normal operations.

26. The method of claim 15, wherein the solution container of the cleaning assembly comprises first and second solution containers, a first solution container receives a container of the cleaning fluid and the second solution container receives a container of the sanitizing fluid, wherein each of the first and second containers when open allows motive fluid mixed with the respective cleaning fluid and the sanitizing fluid to flow through the freezer door.

27. The method of claim 15, wherein the motive fluid is pressurized water received from a public utility water source or an integral reservoir.

28. The method of claim 15, wherein draining at least a portion of the food product from the freezer chamber comprises allowing the motive fluid to flow to an input end where food product is introduced into the food processor during normal operations.

* * * * *